United States Patent
Sugiura et al.

(10) Patent No.: US 11,660,589 B2
(45) Date of Patent: May 30, 2023

(54) EXHAUST GAS PURIFICATION DEVICE

(71) Applicants: Koji Sugiura, Toyota (JP); Hiromasa Nishioka, Toyota (JP); Naoto Miyoshi, Toyota (JP); Akemi Sato, Toyota (JP); Masatoshi Ikebe, Kakegawa (JP); Ryota Nakashima, Kakegawa (JP); Yasutaka Nomura, Kakegawa (JP); Hirotaka Ori, Kakegawa (JP)

(72) Inventors: Koji Sugiura, Toyota (JP); Hiromasa Nishioka, Susono (JP); Naoto Miyoshi, Nagoya (JP); Akemi Sato, Toyota (JP); Masatoshi Ikebe, Kakegawa (JP); Ryota Nakashima, Kakegawa (JP); Yasutaka Nomura, Kakegawa (JP); Hirotaka Ori, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/864,340

(22) Filed: May 1, 2020

(65) Prior Publication Data
US 2020/0368735 A1 Nov. 26, 2020

(30) Foreign Application Priority Data
May 24, 2019 (JP) .............................. JP2019-097705

(51) Int. Cl.
*B01J 23/42* (2006.01)
*B01J 23/44* (2006.01)
(Continued)

(52) U.S. Cl.
CPC .......... *B01J 35/04* (2013.01); *B01D 46/2418* (2013.01); *B01D 53/94* (2013.01); *B01J 23/42* (2013.01);
(Continued)

(58) Field of Classification Search
CPC ... B01J 35/04; B01J 23/42; B01J 23/44; B01J 23/464; B01D 46/2418; B01D 53/94; F01N 3/0821; F01N 3/281
See application file for complete search history.

(56) References Cited

U.S. PATENT DOCUMENTS 7,695,798 B2 * 4/2010 Miwa ................... B01J 23/63
428/117
7,754,160 B2 * 7/2010 Miyairi .................. B01J 35/10
422/180

(Continued)

FOREIGN PATENT DOCUMENTS

CN 107073463 A 8/2017
CN 110314683 A 10/2019
(Continued)

OTHER PUBLICATIONS

U.S. Notice of Allowance dated Oct. 18, 2022, which issued in the corresponding U.S. Appl. No. 17/178,336.
(Continued)

*Primary Examiner* — Cam N. Nguyen
(74) *Attorney, Agent, or Firm* — Dickinson Wright, PLLC

(57) ABSTRACT

An exhaust gas purification device that allows suppressing an increase in pressure loss is provided. The exhaust gas purification device of the present disclosure includes a honeycomb substrate and an inflow cell side catalyst layer. The substrate includes a porous partition wall which defines inflow cells and outflow cells extending from an inflow side end to an outflow side end. The inflow cell side catalyst layer is disposed on a surface on the inflow cell side in an inflow cell side catalyst region from an inflow side end to a position close to an outflow side end of the partition wall. The permeability of a portion including an outflow side region from the position to the outflow side end of the partition wall is higher than a gas permeability of a portion including the
(Continued)

inflow cell side catalyst region of the partition wall and the inflow cell side catalyst layer.

3 Claims, 10 Drawing Sheets

(51) Int. Cl.
| | | |
|---|---|---|
| *B01J 23/46* | (2006.01) | |
| *B01J 35/04* | (2006.01) | |
| *B01D 46/24* | (2006.01) | |
| *B01D 53/94* | (2006.01) | |
| *F01N 3/08* | (2006.01) | |
| *F01N 3/28* | (2006.01) | |

(52) U.S. Cl.
CPC .............. *B01J 23/44* (2013.01); *B01J 23/464* (2013.01); *F01N 3/0821* (2013.01); *F01N 3/281* (2013.01); *B01D 2255/1021* (2013.01); *B01D 2255/1023* (2013.01); *B01D 2255/1025* (2013.01); *B01D 2255/9155* (2013.01)

(56) References Cited

U.S. PATENT DOCUMENTS

| | | | | |
|---|---|---|---|---|
| 7,867,598 B2* | 1/2011 | Miyairi | ................ | B01J 37/0215 428/116 |
| 7,951,338 B2* | 5/2011 | Miyairi | .................... | B01J 35/04 422/177 |
| 8,133,841 B2* | 3/2012 | Noda | ................. | B01D 46/2429 502/439 |
| 8,361,592 B2* | 1/2013 | Miyairi | ............... | C04B 38/0096 428/116 |
| 8,609,581 B2* | 12/2013 | Miyairi | .............. | B01D 46/2474 502/423 |
| 8,894,943 B2* | 11/2014 | Mizutani | ............... | F01N 3/0222 422/180 |
| 9,718,026 B2* | 8/2017 | Otsuki | .................. | B01D 53/94 |
| 9,849,443 B2* | 12/2017 | Harada | .................... | B01J 23/63 |
| 9,932,873 B2* | 4/2018 | Aoki | ...................... | F01N 3/2842 |
| 10,018,095 B2* | 7/2018 | Nomura | ................... | B01J 23/63 |
| 10,071,368 B2* | 9/2018 | Onoe | ....................... | B01J 37/02 |
| 10,076,725 B2* | 9/2018 | Onoe | ....................... | F01N 3/035 |
| 10,086,363 B2* | 10/2018 | Onoe | ....................... | B01J 23/63 |
| 10,125,649 B2* | 11/2018 | Onoe | ........................ | F01N 3/28 |
| 10,159,934 B2* | 12/2018 | Kitamura | ................. | B01J 35/04 |
| 10,159,935 B2* | 12/2018 | Onoe | ....................... | B01J 35/04 |
| 10,183,253 B2* | 1/2019 | Onoe | ................... | B01J 35/0006 |
| 10,201,805 B2* | 2/2019 | Ohashi | .................... | F01N 3/022 |
| 10,344,655 B2* | 7/2019 | Onoe | ....................... | F01N 3/035 |
| 10,357,744 B2* | 7/2019 | Ohashi | ............... | B01D 53/9472 |
| 10,369,520 B2 | 8/2019 | Onoe et al. | | |
| 10,626,765 B2* | 4/2020 | Inoda | .................... | F01N 3/0222 |
| 10,807,032 B2* | 10/2020 | Tanaka | .................... | F01N 3/035 |
| 10,850,269 B2 | 12/2020 | Tanaka et al. | | |
| 2006/0100101 A1 | 5/2006 | Tsuji et al. | | |
| 2016/0138448 A1* | 5/2016 | Itoh | ....................... | F01N 3/0222 422/180 |
| 2017/0304773 A1 | 10/2017 | Onoe et al. | | |
| 2019/0301328 A1 | 10/2019 | Yoshioka et al. | | |
| 2020/0030780 A1 | 1/2020 | Oishi et al. | | |
| 2020/0276567 A1 | 9/2020 | Onoe et al. | | |
| 2020/0368735 A1 | 11/2020 | Sugiura et al. | | |

FOREIGN PATENT DOCUMENTS

| | | |
|---|---|---|
| DE | 202017007046 U1 | 4/2019 |
| JP | 2000282852 A | 10/2000 |
| JP | 2003154223 A | 5/2003 |
| JP | 2007130624 A | 5/2007 |
| JP | 2008272737 A | 11/2008 |
| JP | 2009022953 A | 2/2009 |
| JP | 4393039 B2 | 1/2010 |
| JP | 2010269205 A | 12/2010 |
| JP | 6386697 B | 8/2018 |
| JP | 2020056381 A | 4/2020 |
| JP | 2020193569 A | 12/2020 |

OTHER PUBLICATIONS

Koji Sugiura, Non-Final Office Action dated Jul. 22, 2022 issued in U.S. Appl. No. 17/178,336.
Koji Sugiura et al., Corrected Notice of Allowability dated Feb. 8, 2023 issued in U.S. Appl. No. 17/178,336.

* cited by examiner

EXHAUST GAS PURIFICATION DEVICE

CROSS REFERENCE TO RELATED APPLICATIONS

The present application claims priority from Japanese patent application JP 2019-097705 filed on May 24, 2019, the content of which is hereby incorporated by reference into this application.

BACKGROUND

Technical Field

The present disclosure relates to an exhaust gas purification device that includes a catalyst in a filter having a wall flow structure.

Description of Related Art

An exhaust gas discharged from an internal combustion engine in, for example, an automobile contains a Particulate Matter (PM, hereinafter abbreviated as "PM" in some cases) mainly containing carbon, which causes air pollution, an ash as a non-combustible component, and the like. As a filter to trap and remove the PM from the exhaust gas, a filter having a wall flow structure has been widely used.

The filter having the wall flow structure usually includes a honeycomb substrate. The honeycomb substrate includes a porous partition wall defining a plurality of cells extending from an inflow side end surface to an outflow side end surface, and the plurality of cells include inflow cells and outflow cells adjacent to one another and between which the partition wall is interposed. The inflow cell has an open inflow side end and a sealed outflow side end, and the outflow cell has a sealed inflow side end and an open outflow side end. In view of this, the exhaust gas flown into the inflow cells from the inflow side ends passes through the partition wall to flow into the outflow cells, thus being discharged from the outflow side ends of the outflow cells. When the exhaust gas passes through the partition wall, the PM is trapped inside pores of the partition wall. As examples of the filter having the wall flow structure, a diesel particulate filter (DPF) for diesel engine and a gasoline particulate filter (GPF, hereinafter abbreviated as "GPF" in some cases) for gasoline engine have been known.

Meanwhile, in addition to the PM, the exhaust gas contains harmful components, such as carbon monoxide (CO), hydrocarbons (HC), and nitrogen oxides (NOx). The harmful components can be removed from the exhaust gas by a filter over which a catalyst, such as a noble metal catalyst, is applied.

Recently, to remove both of the PM and the harmful components from the exhaust gas, an exhaust gas purification device including a catalyst in a filter having a wall flow structure has been used. For example, JP 2000-282852 A describes an exhaust gas purification device that includes a NOx reducing catalyst layer on a surface of a porous partition wall in a honeycomb substrate provided with a filter and further includes an oxidation catalyst layer on a surface of the NOx reducing catalyst layer.

SUMMARY

However, in the exhaust gas purification device including the catalyst in the filter having the wall flow structure, providing the catalyst in the porous partition wall in the honeycomb substrate provided with the filter degrades a gas permeability of the partition wall, thus possibly increasing a pressure loss.

The present disclosure has been made in view of the point, and the present disclosure provides an exhaust gas purification device that allows suppressing an increase in pressure loss.

To solve the above-described problem, an exhaust gas purification device according to the present disclosure includes a honeycomb substrate and an inflow cell side catalyst layer. The honeycomb substrate includes a porous partition wall. The porous partition wall defines a plurality of cells extending from an inflow side end surface to an outflow side end surface. The plurality of cells include inflow cells and outflow cells adjacent to one another. The partition wall is interposed between the inflow cells and the outflow cells. The inflow cells have open inflow side ends and sealed outflow side ends. The outflow cells have sealed inflow side ends and open outflow side ends. The inflow cell side catalyst layer is disposed on a surface on the inflow cell side in an inflow cell side catalyst region from an inflow side end to a position close to an outflow side end of the partition wall. A gas permeability of an outflow side partition wall portion including an outflow side region from the position close to the outflow side end to the outflow side end of the partition wall is higher than a gas permeability of a catalyst-disposed partition wall portion including the inflow cell side catalyst region of the partition wall and the inflow cell side catalyst layer.

Effect

The present disclosure ensures the suppressed increase in pressure loss.

DETAILED DESCRIPTION OF THE EMBODIMENTS

An embodiment of an exhaust gas purification device of the present disclosure is an exhaust gas purification device that includes a honeycomb substrate and an inflow cell side catalyst layer. The honeycomb substrate includes a porous partition wall. The porous partition wall defines a plurality of cells extending from an inflow side end surface to an outflow side end surface. The plurality of cells include inflow cells and outflow cells adjacent to one another. The partition wall is interposed between the inflow cells and the outflow cells. The inflow cells have open inflow side ends and sealed outflow side ends. The outflow cells have sealed inflow side ends and open outflow side ends. The inflow cell side catalyst layer is disposed on a surface on the inflow cell side in an inflow cell side catalyst region from an inflow side end to a position close to an outflow side end of the partition wall. A gas permeability of an outflow side partition wall portion including an outflow side region from the position close to the outflow side end to the outflow side end of the partition wall is higher than a gas permeability of a catalyst-disposed partition wall portion including the inflow cell side catalyst region of the partition wall and the inflow cell side catalyst layer.

Here, the "inflow side" means a side from which an exhaust gas flows into the exhaust gas purification device and the "outflow side" means a side from which the exhaust gas flows out in the exhaust gas purification device.

In this embodiment, while an extending direction of the partition wall is not specifically limited, the extending direction of the partition wall is usually approximately the same as an axial direction of the honeycomb substrate, and while an extending direction of the cell is not specifically limited, the extending direction of the cell is usually approximately the same as the extending direction of the partition wall. In the description of this embodiment, the "extending direction" means the extending direction of the partition wall and the extending direction of the cell, and means the direction which is approximately the same as the axial direction of the honeycomb substrate. The following describes a first embodiment and a second embodiment as the embodiments.

I. First Embodiment

An exhaust gas purification device according to the first embodiment features that a catalyst layer is absent on the surface on the inflow cell side or an inner region on the inflow cell side in the outflow side region of the partition wall.

Figure 1:
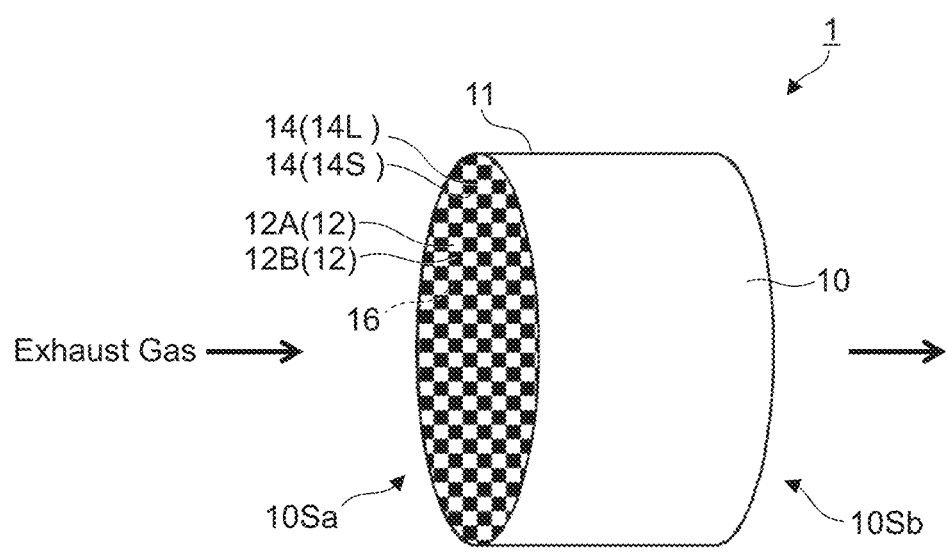
FIG. 1 is a perspective view schematically illustrating an exhaust gas purification device of each example according to an embodiment of the exhaust gas purification device of the present disclosure.
Figure 2:
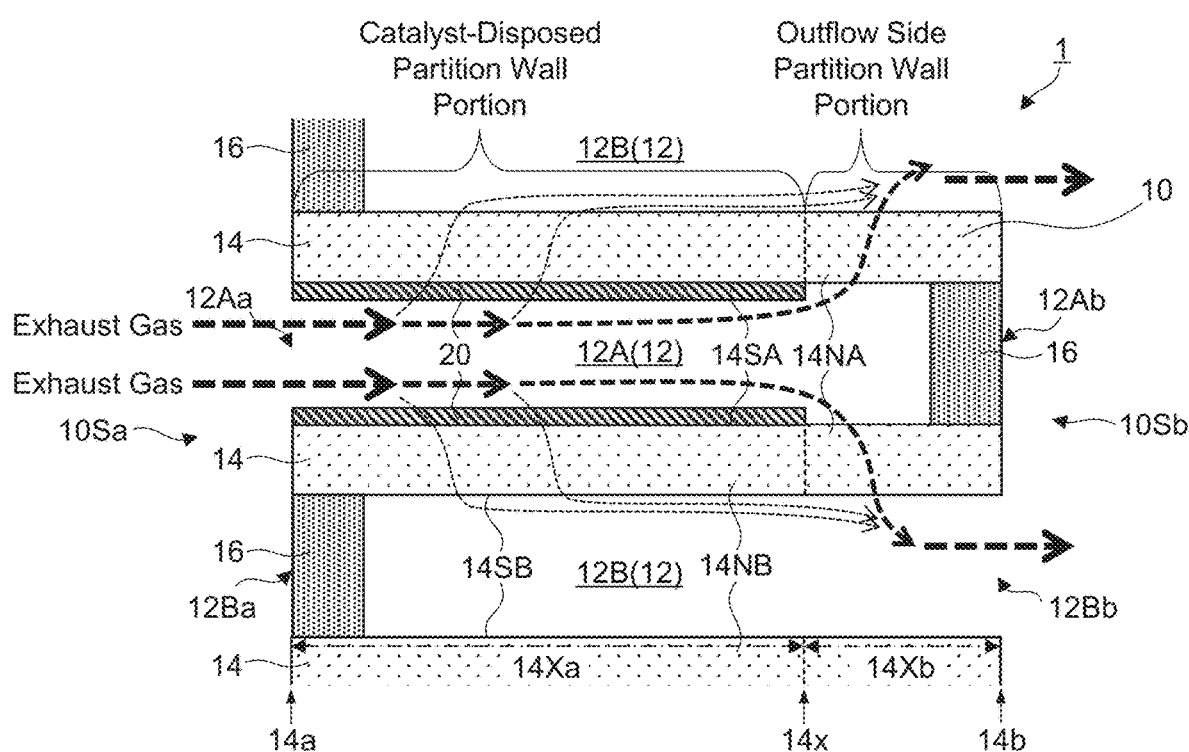
FIG. 2 is a cross-sectional view schematically illustrating a main part on a cross-sectional surface parallel to an extending direction of a cell in an exhaust gas purification device of a first example according to a first embodiment.

First, the following describes an outline of the exhaust gas purification device according to the first embodiment with examples. Here, FIG. 1 is a perspective view schematically illustrating the exhaust gas purification device of each example according to the embodiment of the exhaust gas purification device of the present disclosure. FIG. 2 is a cross-sectional view schematically illustrating a main part on a cross-sectional surface parallel to the extending direction of the cell in an exhaust gas purification device of a first example according to the first embodiment.

As illustrated in FIG. 1 and FIG. 2, an exhaust gas purification device 1 of the first example includes a honeycomb substrate 10, a sealing portion 16, and an inflow cell side catalyst layer 20. The honeycomb substrate 10 is a substrate in which a cylindrical-shaped frame portion 11 and a partition wall 14 partitioning a space inside the frame portion 11 into a honeycomb shape are integrally formed. The partition wall 14 is a porous one that defines a plurality of cells 12 extending from an inflow side end surface 10Sa to an outflow side end surface 10Sb. The partition wall 14 includes a plurality of wall portions 14L arranged separated from and parallel to one another such that the shapes of cross-sections perpendicular to an extending direction of the plurality of cells 12 have square shapes, and a plurality of wall portions 14S orthogonal to the plurality of wall portions 14L and arranged separated from and parallel to one another. A cross-sectional surface of the partition wall 14 perpendicular to the extending direction has a grid shape.

The plurality of cells 12 include inflow cells 12A and outflow cells 12B adjacent to one another and between which the partition wall 14 is interposed. The inflow cell 12A has an open inflow side end 12Aa in the extending direction and an outflow side end 12Ab in the extending direction sealed by the sealing portion 16. The outflow cell 12B has an inflow side end 12Ba in the extending direction sealed by the sealing portion 16 and an open outflow side end 12Bb in the extending direction.

The inflow cell side catalyst layer 20 contains catalyst metal particles containing at least one kind (not illustrated) of palladium (Pd) and platinum (Pt) and a carrier (not illustrated) that supports them. The inflow cell side catalyst layer 20 is disposed on a surface 14SA on the inflow cell side in an inflow cell side catalyst region 14Xa from an inflow side end 14a to a position 14x close to the outflow side end in an extending direction of the partition wall 14. A catalyst layer is absent on the surface 14SA on the inflow cell side and in an inner region 14NA on the inflow cell side in an outflow side region 14Xb from the position 14x close to the outflow side end to an outflow side end 14b in the extending direction of the partition wall 14. Accordingly, in the exhaust gas purification device 1 of the first example, a gas permeability of the outflow side partition wall portion including the outflow side region 14Xb of the partition wall 14 is higher than that of the catalyst-disposed partition wall portion including the inflow cell side catalyst region 14Xa of the partition wall 14 and the inflow cell side catalyst layer 20.

Therefore, as illustrated in FIG. 1, when the exhaust gas passes through the exhaust gas purification device 1 of the first example so as to flow in from the inflow side end surface 10Sa and outflow from the outflow side end surface 10Sb to the outside, as illustrated in FIG. 2, the exhaust gas first flows in the inflow cell 12A from the inflow side end 12Aa. As described above, the gas permeability of the outflow side partition wall portion is higher than that of the catalyst-disposed partition wall portion. Furthermore, under various situations including a situation where a flow rate of the exhaust gas is high under a high-load operation condition and a situation where the PM is deposited, a pressure of the exhaust gas inside the inflow cell 12A is higher on the outflow side partition wall portion side compared with that on the catalyst-disposed partition wall portion side. In view of this, under the various situations, the exhaust gas flown into the inflow cell 12A mostly flows up to the outflow side partition wall portion while in contact with the inflow cell side catalyst layer 20. After that, by passing through the outflow side partition wall portion, the exhaust gas flows into the outflow cell 12B and flows out from the outflow side end 12Bb of the outflow cell 12B to the outside. Note that the remaining exhaust gas flown into the inflow cell 12A passes through the catalyst-disposed partition wall portion to outflow from the outflow side end 12Bb of the outflow cell 12B to the outside after flowing in the outflow cell 12B.

Figure 3:
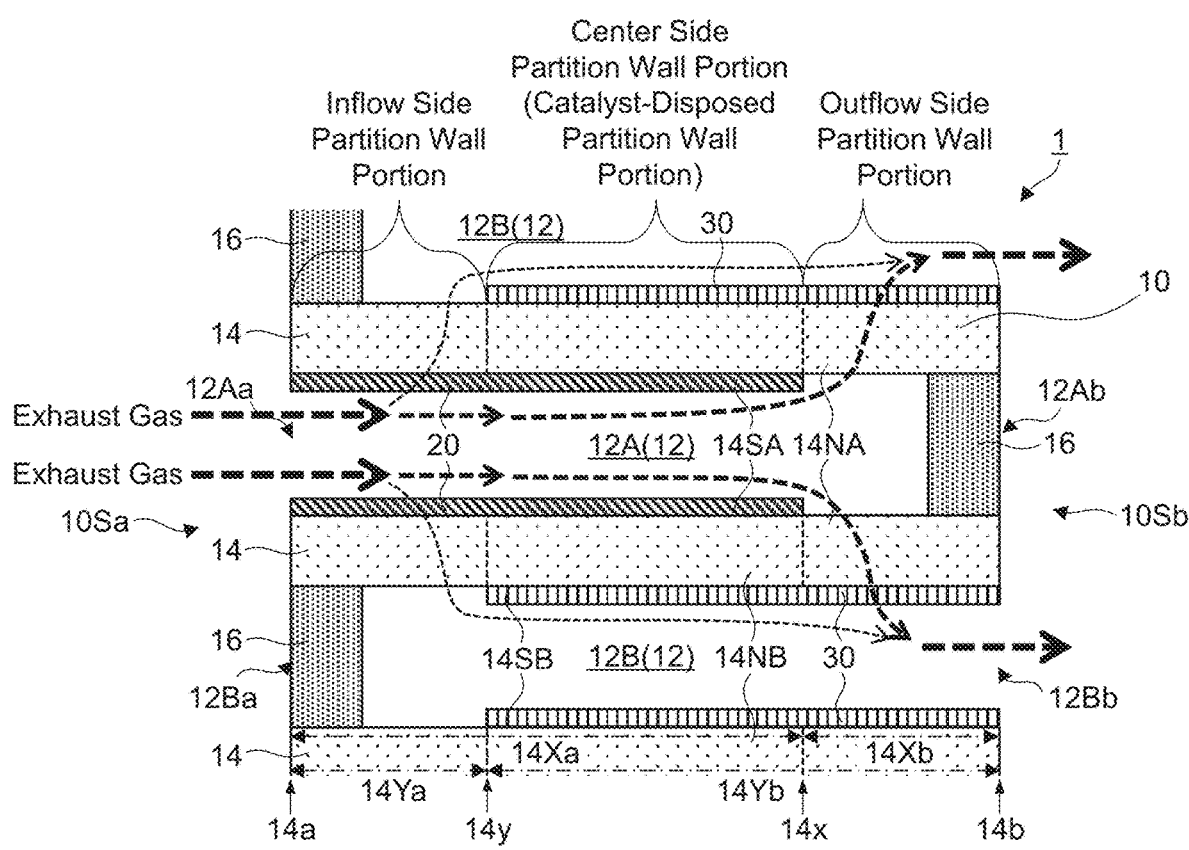
FIG. 3 is a cross-sectional view schematically illustrating a main part on a cross-sectional surface parallel to an extending direction of a cell in an exhaust gas purification device of a second example according to the first embodiment.

Here, FIG. 3 is a cross-sectional view schematically illustrating a main part on a cross-sectional surface parallel to the extending direction of the cell in an exhaust gas purification device of a second example according to the first embodiment.

As illustrated in FIG. 3, the exhaust gas purification device 1 of the second example further includes an outflow cell side catalyst layer 30, in addition to the honeycomb substrate 10, the sealing portion 16, and the inflow cell side catalyst layer 20 which are the same as those of the exhaust gas purification device of the first example. The outflow cell side catalyst layer 30 contains catalyst metal particles (not illustrated) containing rhodium (Rh) and a carrier (not illustrated) that supports the catalyst metal particles. The outflow cell side catalyst layer 30 is disposed on a surface 14SB on the outflow cell side in an outflow cell side catalyst region 14Yb from a position 14y close to the inflow side end to the outflow side end 14b in the extending direction of the partition wall 14.

The inflow cell side catalyst layer 20 and the outflow cell side catalyst layer 30 are disposed on the surface 14SA on the inflow cell side and the surface 14SB on the outflow cell side in an overlapping part of the inflow cell side catalyst region 14Xa and the outflow cell side catalyst region 14Yb of the partition wall 14, respectively. Meanwhile, the outflow cell side catalyst layer 30 is disposed on the surface 14SB on the outflow cell side in the outflow side region 14Xb from the position 14x close to the outflow side end to the outflow side end 14b of the partition wall 14. The inflow cell side catalyst layer 20 is disposed on the surface 14SA on the inflow cell side in an inflow side region 14Ya from the inflow side end 14a to the position 14y close to the inflow side end of the partition wall 14.

Accordingly, in the exhaust gas purification device 1 of the second example, a gas permeability of the outflow side partition wall portion including the outflow side region 14Xb of the partition wall 14 and the outflow cell side catalyst layer 30 disposed in the outflow side region 14Xb is higher than that of a center side partition wall portion (catalyst-disposed partition wall portion) including the overlapping part of the inflow cell side catalyst region 14Xa and the outflow cell side catalyst region 14Yb of the partition wall and the inflow cell side catalyst layer 20 and the outflow cell side catalyst layer 30 disposed in the overlapping part. A gas permeability of the inflow side partition wall portion including the inflow side region 14Ya of the partition wall 14 and the inflow cell side catalyst layer 20 disposed in the inflow side region 14Ya is also higher than that of the center side partition wall portion.

Therefore, as illustrated in FIG. 1, when the exhaust gas passes through the exhaust gas purification device 1 of the second example, as illustrated in FIG. 3, the exhaust gas first flows into the inflow cell 12A from the inflow side end 12Aa. As described above, the gas permeabilities of the outflow side partition wall portion and the inflow side partition wall portion are higher than that of the center side partition wall portion. Furthermore, under various situations, a pressure of the exhaust gas inside the inflow cell 12A is higher on the outflow side partition wall portion side compared with those on the inflow side partition wall portion side and the center side partition wall portion side. In view of this, under the various situations, the exhaust gas flown into the inflow cell 12A mostly flows up to the outflow side partition wall portion while in contact with the inflow cell side catalyst layer 20. After that, by passing through the outflow side partition wall portion, the exhaust gas flows in the outflow cell 12B and flows out from the outflow side end 12Bb of the outflow cell 12B to the outside. The remaining exhaust gas flown into the inflow cell 12A passes through the inflow side partition wall portion to flow in the outflow cell 12B and subsequently flows up to the outflow side end 12Bb of the outflow cell 12B while in contact with the outflow cell side catalyst layer 30 and flows out from the outflow side end 12Bb to the outside.

The exhaust gas purification device according to the first embodiment, as in the first example and the second example, includes the inflow cell side catalyst layer, which is disposed on the surface on the inflow cell side in the inflow cell side catalyst region of the partition wall, the catalyst layer is absent on the surface on the inflow cell side or in the inner region on the inflow cell side in the outflow side region of the partition wall, and the gas permeability of the outflow side partition wall portion including the outflow side region of the partition wall is higher than that of the catalyst-disposed partition wall portion including the inflow cell side catalyst region of the partition wall and the inflow cell side catalyst layer. In view of this, under the various situations, the exhaust gas flown into the inflow cell mostly flows up to the outflow side partition wall portion while in contact with the inflow cell side catalyst layer. After that, by passing through the outflow side partition wall portion, the exhaust gas flows into the outflow cell and flows out from the outflow side end of the outflow cell to the outside. This ensures the suppressed increase in pressure loss. Furthermore, increasing a contact time of the exhaust gas and the inflow cell side catalyst layer ensures the improved purification performance. Note that, unlike the second embodiment described later, since the exhaust gas does not pass through the outflow side catalyst layer when passing through the outflow side partition wall portion, a pressure loss can be effectively suppressed.

Since the catalyst layer needs not be disposed on the inflow cell side in the outflow side region of the partition wall, a cost of a catalyst can be reduced. Furthermore, the exhaust gas flown into the inflow cell can mostly pass through the outflow side partition wall portion where the catalyst layer is absent, thereby ensuring easily trapping the PM in the exhaust gas in the pores of the partition wall.

Furthermore, among the exhaust gas purification devices according to the first embodiment, the exhaust gas purification device that does not include the catalyst layer on the outflow cell side of the partition wall as in the first example can effectively suppress the pressure loss because the gas permeability of the outflow side partition wall portion increases. Additionally, the exhaust gas purification device that further includes the outflow cell side catalyst layer disposed on the outflow cell side in the outflow cell side catalyst region of the partition wall as in the second example exhibits the gas permeability of the inflow side partition wall portion higher than that of the center side partition wall portion (catalyst-disposed partition wall portion). In view of this, a part of the exhaust gas flown into the inflow cell passes through the inflow side partition wall portion to flow into the outflow cell and subsequently flows up to the outflow side end of the outflow cell while in contact with the outflow cell side catalyst layer. This ensures the effectively improved purification performance.

Subsequently, the following describes respective configurations of the exhaust gas purification device according to the first embodiment in detail.

1. Honeycomb Substrate

The honeycomb substrate includes the porous partition wall defining the plurality of cells extending from the inflow side end surface to the outflow side end surface. The plurality of cells include the inflow cells and the outflow cells adjacent to one another and between which the partition wall is interposed. The inflow cell has the open inflow side end and the sealed outflow side end, and the outflow cell has the sealed inflow side end and the open outflow side end. The honeycomb substrate is what is called a wall flow type honeycomb substrate.

The honeycomb substrate is a substrate in which the frame portion and the partition wall partitioning the space inside the frame portion into the honeycomb shape are integrally formed.

While an axial length of the honeycomb substrate is not specifically limited and a general length can be used, for example, the length is within a range of 10 mm or more and 500 mm or less in some embodiments and among them, within a range of 50 mm or more and 300 mm or less in some embodiments. While a capacity of the honeycomb substrate, namely, a total volume of the cells is not specifically limited and a general capacity can be used, for example, the capacity is within a range of 0.1 L or more and 5 L or less in some embodiments.

While a material of the honeycomb substrate is not specifically limited and a general material can be used, examples of the material include, a ceramic, such as cordierite, silicon carbide (SiC), and aluminum titanate, and an alloy, such as a stainless steel.

While a shape of the frame portion is not specifically limited and a general shape can be used, examples of the shape include a tubular shape, such as an elliptical cylindrical shape and a polygonal cylindrical shape, in addition to a cylindrical shape. Another configuration of the frame portion is not specifically limited and a general configuration can be used.

A shape of the partition wall is not specifically limited and a general shape can be used. While a length of the extending direction of the partition wall is not specifically limited, the length is usually approximately the same as the axial length of the honeycomb substrate. While a thickness of the partition wall is not specifically limited and a general thickness can be used, for example, the thickness is within a range of 50 μm or more and 2000 μm or less in some embodiments and among them, within a range of 100 μm or more and 1000 μm or less in some embodiments. This is because the thickness of the partition wall in these ranges ensures obtaining a sufficient trap performance of a PM while ensuring strength of the substrate, and the pressure loss can be sufficiently suppressed.

The partition wall has a porous structure through which the exhaust gas is allowed to pass. While a porosity of the partition wall is not specifically limited and a general porosity can be used, for example, the porosity is within a range of 40% or more and 70% or less in some embodiments and among them, within a range of 50% or more and 70% or less in some embodiments. This is because the porosity at the lower limit or more of these ranges ensures effectively suppressing the pressure loss and the porosity at the upper limit or less of these ranges allows ensuring sufficient mechanical strength. While an average pore diameter of the pores of the partition wall is not specifically limited and a general average pore diameter can be used, for example, the average pore diameter is within a range of 1 μm or more and 60 μm or less in some embodiments and among them, within a range of 5 μm or more and 30 μm or less in some embodiments. This is because the average pore diameter of the pores in these ranges allows obtaining the sufficient trap performance of a PM and the pressure loss can be sufficiently suppressed. Not that "the average pore diameter of the pores of the partition wall" means, for example, one measured by a bubble point method using a perm porometer.

The inflow cells and the outflow cells are formed by partitioning the space inside the frame portion with the partition wall and adjacent to one another, and between the inflow cells and the outflow cells, the partition wall is interposed. The inflow cells and the outflow cells are usually surrounded by the partition wall in a direction perpendicular to the extending direction.

The inflow cell has the outflow side end usually sealed by the sealing portion. The outflow cell has the inflow side end usually sealed by the sealing portion. While a length in the extending direction of the sealing portion is not specifically limited and a general length may be used, for example, the length is within a range of 2 mm or more and 20 mm or less in some embodiments. A material of the sealing portion is not specifically limited and may be a general material.

Cross-sectional shapes perpendicular to the extending direction of the inflow cell and the outflow cell are not specifically limited and general shapes can be used. The cross-sectional shapes can be appropriately configured considering the flow rate, components, and the like of the exhaust gas passing through the exhaust gas purification device. Examples of the cross-sectional shape include a rectangular shape, such as a square, a polygon including a hexagon and the like, and a circular shape. While cross-sectional areas perpendicular to the extending direction of the inflow cell and the outflow cell are not specifically limited and general cross-sectional areas can be used, for example, the cross-sectional areas are within a range of 1 $mm^2$ or more and 7 $mm^2$ or less. While lengths in the extending direction of the inflow cell and the outflow cell are not specifically limited, the lengths are usually approximately the same as a length found by subtracting the length in the extending direction of the sealing portion from the axial length of the honeycomb substrate. Examples of an arrangement aspect of the inflow cells and the outflow cells include, like the arrangement aspects of the first example and the second example, an aspect like a checkered pattern in which the inflow cells and the outflow cells are arranged in alternation.

2. Inflow Cell Side Catalyst Layer

The inflow cell side catalyst layer is disposed on the surface on the inflow cell side in the inflow cell side catalyst region from the inflow side end to the position close to the outflow side end of the partition wall. Accordingly, the inflow cell side catalyst layer closes the pores in the inflow cell side catalyst region of the partition wall, and the gas permeability of the outflow side partition wall portion including the outflow side region of the partition wall is higher than that of the catalyst-disposed partition wall portion including the inflow cell side catalyst region of the partition wall and the inflow cell side catalyst layer.

Here, "the position close to the outflow side end" means a position close to the outflow side end with respect to the center in the extending direction of the partition wall. Additionally, "disposed on the surface on the inflow cell side in the inflow cell side catalyst region of the partition wall" means "disposed in contact with the surface on the inflow cell side in the inflow cell side catalyst region of the partition wall on the outside of the partition wall."

While a length in the extending direction of the inflow cell side catalyst layer is not specifically limited insofar as it is longer than ½ of the length in the extending direction of the partition wall, the length is within a range of more than ½ and ⅘ or less of the length in the extending direction of the partition wall in some embodiments and among them, within a range of ⅗ or more and ⅘ or less, and specifically within a range of ⅔ or more and ⅘ or less in some embodiments. This is because, with the length exceeding the lower limits of these ranges or equal to or more than the lower limits, even under a situation where the flow rate of the exhaust gas is high under the high-load operation condition, sufficiently increasing the contact time of the exhaust gas to the inflow cell side catalyst layer ensures the improved purification performance. This is because the length at the upper limit or less of these ranges ensures the effectively suppressed pressure loss, and further, as a length in the extending direction of the region where the inflow cell side catalyst layer is absent in the partition wall, a length exceeding an assumed deposition thickness of an ash can be ensured.

While the thickness of the inflow cell side catalyst layer is not specifically limited and a general thickness can be used, for example, the thickness is in a range of 5% or more of the thickness of the partition wall in some embodiments. This is because the thickness at the lower limit or more of these ranges ensures the effectively suppressed passing of the exhaust gas through the catalyst-disposed partition wall portion including the inflow cell side catalyst region of the partition wall and the inflow cell side catalyst layer. Note that the upper limit of the range of the thickness of the inflow cell side catalyst layer can be appropriately configured considering the pressure loss and the like.

The inflow cell side catalyst layer usually contains the catalyst metal particles and the carrier that supports the catalyst metal particles. The inflow cell side catalyst layer is, for example, a porous sintered body of a carrier with catalyst supporting the catalyst metal particles.

While a material of the catalyst metal particles is not specifically limited and a general material can be used, examples of the material include a noble metal, such as rhodium (Rh), palladium (Pd), and platinum (Pt). The material of the catalyst metal particles may be one kind of metal or two or more kinds of metals or may be an alloy containing two or more kinds of metals. The material of the catalyst metal particles is at least one kind of Pd, Pt, and the like in some embodiments.

While an average grain diameter of the catalyst metal particles is not specifically limited and a general average grain diameter can be used, for example, the average grain diameter is within a range of 0.1 nm or more and 20 nm or less in some embodiments. This is because the average grain diameter at the upper limit or less of the range allows increasing a contact area with the exhaust gas. Note that the average grain diameter of the catalyst metal particles means, for example, an average value obtained from grain diameters measured with a transmission electron microscope (TEM).

While a content of the catalyst metal particles is not specifically limited and a general content can be used, the content differs depending on the material of the catalyst metal particles. For example, when the material is Pd, Pt, or Rh, the content is within a range of 0.05 g or more and 5 g or less per liter of the honeycomb substrate in some embodiments. This is because the content at the lower limit or more of the range allows sufficiently obtaining a catalytic action, and the content at the upper limit or less of the range is advantageous from an aspect of cost, simultaneously with ensuring suppressing a grain growth of the catalyst metal particles. Here, "the content of the catalyst metal particles per liter of a volume of the substrate" means a value found by dividing a mass of the catalyst metal particles contained in the inflow cell side catalyst layer by a volume of a part in the axial direction of the honeycomb substrate, wherein the part in the axial direction of the honeycomb substrate has the axial length which is the same as the length in the extending direction of the inflow cell side catalyst layer.

A material of the carrier is not specifically limited and a general material can be used. Examples of the material include a metal oxide, such as alumina ($Al_2O_3$), zirconia ($ZrO_2$), ceria ($CeO_2$), silica ($SiO_2$), magnesia (MgO), and titanium oxide ($TiO_2$) or, for example, solid solution of these substances, such as a ceria-zirconia ($CeO_2$—$ZrO_2$) composite oxide. The material of the carrier may be one kind or two kinds or more of these substances. The material of the carrier is at least one kind of alumina, a ceria-zirconia composite oxide, and the like in some embodiments.

While a shape of the carrier is not specifically limited and a general shape can be used, the shape is powdery in some embodiments. This is because a further large specific surface area can be ensured. While an average grain diameter of the powdery carrier is not specifically limited, for example, the average grain diameter is within a range of 0.01 µm or more and 20 µm or less in some embodiments. This is because the average grain diameter at the lower limit or more of the range allows obtaining a sufficient heat resistant property and the average grain diameter at the upper limit or less of the range sufficiently ensures dispersibility of the catalyst metal particles, thereby ensuring the effectively improved purification performance. Note that "the average grain diameter of the powdery carrier" means an average grain diameter obtained by, for example, laser diffraction/scattering method.

With a mass ratio of the catalyst metal particles to a total mass of the catalyst metal particles and the carrier is not specifically limited and a general mass ratio can be used, for example, the mass ratio is within a range of 0.01 mass % or more and 10 mass % or less in some embodiments. This is because the mass ratio at the lower limit or more of the range allows obtaining the sufficient catalytic action and the mass ratio at the upper limit or less of the range is advantageous from an aspect of cost, simultaneously with ensuring suppressing the grain growth of the catalyst metal particles.

While a method for causing the carrier to support the catalyst metal particles is not specifically limited and a general method can be used, examples of the method include a method that immerses a carrier in water solution containing catalyst metal salt (for example, nitrate) or a catalytic metal complex (for example, a tetraamine complex), and then dries and fires the carrier.

The inflow cell side catalyst layer may contain a promoter that does not support the catalyst metal particles, in addition to the catalyst metal particles and the carrier. While the promoter is not specifically limited and a general promoter can be used, examples of the promoter include alumina, silica, and a ceria-zirconia composite oxide. While a shape of the promoter is not specifically limited and a general shape can be used, the shape is powdery in some embodiments. While a mass ratio of the promoter to a total mass of the catalyst metal particles, the carrier, and the promoter is not specifically limited and a general mass ratio can be used, for example, the mass ratio is within a range of 30 mass % or more and 80 mass % or less in some embodiments.

The inflow cell side catalyst layer may be a single catalyst layer or may include a part where a plurality of different catalyst layers are stacked. Examples of one that includes the part where the plurality of different catalyst layers are stacked include one where a plurality of catalyst layers containing different catalyst metal particles are stacked and one where a plurality of catalyst layers having different lengths in the extending direction are stacked. More specifically, for example, one where a catalyst layer containing catalyst metal particles for which palladium (Pd) is used and a catalyst layer containing catalyst metal particles for which rhodium (Rh) is used are stacked by supplying their slurries at different lengths in an in-plane direction on the surface of the partition wall in order.

While a density of the inflow cell side catalyst layer is not specifically limited, for example, the density is within a range of 30 g/L or more and 250 g/L or less in some embodiments. This is because the density at the lower limit or more of the range ensures the effectively improved purification performance. This is because the density at the upper limit or less of the range ensures the effectively suppressed pressure loss. Note that "the density of the inflow cell side catalyst layer" means a value found by dividing a total mass of the inflow cell side catalyst layer by the volume of a part in the axial direction of the honeycomb substrate, wherein the part in the axial direction of the honeycomb substrate has the axial length which is the same as the length in the extending direction of the inflow cell side catalyst layer.

While a method for forming the inflow cell side catalyst layer is not specifically limited and a general method can be used, examples of the method include a method that supplies a slurry on the surface on the inflow cell side in the inflow cell side catalyst region of the partition wall and then dries and fires the slurry.

The slurry contains the catalyst metal particles and the carrier contained in the inflow cell side catalyst layer. In addition to the catalyst metal particles and the carrier, the slurry may appropriately contain any component, such as an oxygen absorption/release material, a binder, and an additive. An average grain diameter of the powdery carrier contained in the slurry and the like may be appropriately adjusted such that the slurry does not penetrate the inside of the partition wall.

While a method for supplying the slurry to the surface on the inflow cell side in the inflow cell side catalyst region of the partition wall is not specifically limited and a general method can be used, examples of the method include a method that immerses the honeycomb substrate in the slurry from the inflow side end surface side and takes out the honeycomb substrate from the slurry after a lapse of a predetermined period. This method may apply pressure to the outflow cells from the outflow side end side to generate a pressure difference between the outflow cells and the inflow cells to avoid the slurry to penetrate the inside of the partition wall. Alternatively, for example, a property, such as a concentration of solid content and viscosity of the slurry, may be appropriately adjusted to avoid the slurry to penetrate the inside of the partition wall.

While a drying condition in the method that supplies the slurry to the surface on the inflow cell side in the inflow cell side catalyst region of the partition wall and then dries and fires the slurry is not specifically limited, although depending on the shape and the dimensions of the honeycomb substrate or the carrier, for example, the drying condition is a condition that dries the slurry at a temperature within a range of 80° C. or more and 300° C. or less for a period within a range of one hour or more and 10 hours or less in some embodiments. While a firing condition is not specifically limited, for example, the firing condition is a condition that performs firing at a temperature within a range of 400° C. or more and 1000° C. or less for a period within a range of one hour or more and four hours or less in some embodiments.

Note that properties, such as the thickness and the porosity of the inflow cell side catalyst layer, can be adjusted by properties of the slurry, an amount of supplied slurry, the drying condition, the firing condition, and the like.

3. Exhaust Gas Purification Device

The exhaust gas purification device includes the honeycomb substrate and the inflow cell side catalyst layer. The gas permeability of the outflow side partition wall portion including the outflow side region from the position close to the outflow side end to the outflow side end of the partition wall is higher than that of the catalyst-disposed partition wall portion including the inflow cell side catalyst region of the partition wall and the inflow cell side catalyst layer.

Here, "the outflow side partition wall portion" specifically means the partition wall portion including at least the outflow side region of the partition wall. In view of this, the outflow side partition wall portion may include only the outflow side region of the partition wall like the outflow side partition wall portion of the first example or may include the outflow side region of the partition wall and the outflow cell side catalyst layer disposed in the outflow side region like the outflow side partition wall portion of the second example. Additionally, the "catalyst-disposed partition wall portion" specifically means the partition wall portion including at least a part of the outflow side in the inflow cell side catalyst region of the partition wall and the inflow cell side catalyst layer disposed in the part. In view of this, the catalyst-disposed partition wall portion may include the inflow cell side catalyst region of the partition wall and the inflow cell side catalyst layer like the catalyst-disposed partition wall portion of the first example or may include the overlapping part of the inflow cell side catalyst region and the outflow cell side catalyst region of the partition wall, and the inflow cell side catalyst layer and the outflow cell side catalyst layer disposed in the overlapping part like the center side partition wall portion of the second example.

(1) Outflow Cell Side Catalyst Layer

While the exhaust gas purification device is not specifically limited, the exhaust gas purification device may further include the outflow cell side catalyst layer disposed on the surface on the outflow cell side or in the inner region on the outflow cell side in the outflow cell side catalyst region from the position close to the inflow side end to the outflow side end of the partition wall as in the second example.

Here, "the position close to the inflow side end" means a position close to the inflow side end with respect to the center in the extending direction of the partition wall. "Disposed on the surface on the outflow cell side in the outflow cell side catalyst region of the partition wall" means "disposed in contact with the surface on the outflow cell side in the outflow cell side catalyst region of the partition wall on the outside of the partition wall." "Disposed in the inner region on the outflow cell side in the outflow cell side catalyst region of the partition wall" means "disposed in a region facing the outflow cell inside the outflow side region of the partition wall."

In the outflow cell side catalyst layer, at the outflow cell side catalyst layer disposed on the surface on the outflow cell side of the partition wall, an area with which the exhaust gas flown into the outflow cell is in contact increases, and the purification performance can be effectively improved. Meanwhile, at the outflow cell side catalyst layer disposed in the inner region on the outflow cell side of the partition wall, the gas permeability of the outflow side partition wall portion including the outflow side region of the partition wall and the outflow cell side catalyst layer disposed in the outflow side region is increased. Regarding the outflow cell side catalyst layer, the following separately describes the outflow cell side catalyst layer disposed on the surface on the outflow cell side of the partition wall and the outflow cell side catalyst layer disposed in the inner region on the outflow cell side of the partition wall.

a. Outflow Cell Side Catalyst Layer Disposed on the Surface on the Outflow Cell Side of the Partition Wall While a thickness of the outflow cell side catalyst layer is not specifically limited and a general thickness can be used, for example, the thickness is in a range of 5% or more of the thickness of the partition wall in some embodiments. This is because the thickness at the lower limit or more of the range ensures the effectively suppressed passing of the exhaust gas through the center side partition wall portion including the overlapping part of the inflow cell side catalyst region and the outflow cell side catalyst region of the partition wall, and the inflow cell side catalyst layer and the outflow cell side catalyst layer disposed in the overlapping part. Note that the upper limit of the range of the thickness of the outflow cell side catalyst layer can be appropriately configured considering the pressure loss and the like.

The outflow cell side catalyst layer usually contains the catalyst metal particles and the carrier that supports the catalyst metal particles. The outflow cell side catalyst layer is, for example, a porous sintered body of a carrier with catalyst supporting the catalyst metal particles.

Since the material of the catalyst metal particles is similar to that of the inflow cell side catalyst layer excluding that rhodium (Rh) and the like is used in some embodiments, the description is omitted here. Since an average grain diameter of the catalyst metal particles is similar to that of the inflow cell side catalyst layer, the description is omitted here.

While a content of the catalyst metal particles is not specifically limited and a general content can be used, the content differs depending on the material of the catalyst metal particles. For example, when the material is Rh, Pd, or Pt, the content is within a range of 0.01 g or more and 2 g or less per liter of the honeycomb substrate in some embodiments. This is because the content at the lower limit or more of the range allows sufficiently obtaining a catalytic action, and the content at the upper limit or less of the range is advantageous from an aspect of cost, simultaneously with ensuring suppressing a grain growth of the catalyst metal particles. Here, "the content of the catalyst metal particles per liter of a volume of the substrate" means a value found by dividing a mass of the catalyst metal particles contained in the outflow cell side catalyst layer by a volume of a part in the axial direction of the honeycomb substrate, wherein the part in the axial direction of the honeycomb substrate has the axial length which is the same as the length in the extending direction of the outflow cell side catalyst layer.

Since the material and the shape of the carrier, and the average grain diameter of the powdery carrier are similar to those of the inflow cell side catalyst layer, the description is omitted here. Since the mass ratio of the catalyst metal particles to the total mass of the catalyst metal particles and the carrier is similar to that of the inflow cell side catalyst layer, the description is omitted here. Since a method for causing the carrier to support the catalyst metal particles is similar to that of the inflow cell side catalyst layer, the description is omitted here. The outflow cell side catalyst layer may contain the promoter similarly to the inflow cell side catalyst layer.

While a density of the outflow cell side catalyst layer is not specifically limited, the density is within a range of 30 g/L or more and 250 g/L or less in some embodiments. This is because the density at the lower limit or more of the range ensures the effectively improved purification performance. This is because the density at the upper limit or less of the range ensures the effectively suppressed pressure loss. Note that "the density of the outflow cell side catalyst layer" means a value found by dividing a total mass of the outflow cell side catalyst layer by the volume of a part in the axial direction of the honeycomb substrate, wherein the part in the axial direction of the honeycomb substrate has the axial length which is the same as the length in the extending direction of the outflow cell side catalyst layer.

While a method for forming the outflow cell side catalyst layer is not specifically limited and a general method can be used, examples of the method include a method that supplies a slurry to the surface on the outflow cell side in the outflow cell side catalyst region of the partition wall and then dries and fires the slurry.

Except that the slurry contains the catalyst metal particles and the carrier contained in the outflow cell side catalyst layer, since the slurry is similar to that of the method for forming the inflow cell side catalyst layer, the description is omitted here.

While a method for supplying the slurry to the surface on the outflow cell side in the outflow cell side catalyst region of the partition wall is not specifically limited and a general method can be used, examples of the method include a method that immerses the honeycomb substrate in the slurry from the outflow side end surface side and takes out the honeycomb substrate from the slurry after a lapse of a predetermined period. This method may apply pressure to the inflow cells from the inflow side to generate a pressure difference between the inflow cells and the outflow cells to avoid the slurry to penetrate the inside of the partition wall. Alternatively, a property, such as a concentration of solid content and viscosity of the slurry, may be appropriately adjusted to avoid the slurry to penetrate the inside of the partition wall. Since the drying condition and the firing condition are similar to those of the method for forming the inflow cell side catalyst layer, the description is omitted here. Note that properties, such as the thickness and the porosity of the outflow cell side catalyst layer can be adjusted by properties of the slurry, an amount of supplied slurry, the drying condition, the firing condition, and the like.

b. Outflow Cell Side Catalyst Layer Disposed in the Inner Region on the Outflow Cell Side of the Partition Wall While a thickness of the outflow cell side catalyst layer is not specifically limited and a general thickness can be used, for example, the thickness is within a range of 50% or more and 100% or less of the thickness of the partition wall in some embodiments. This is because the thickness at the lower limit or more of the range allows ensuring a frequency of contact of the exhaust gas with the catalyst layer while the exhaust gas passes through the partition wall.

The outflow cell side catalyst layer usually contains the catalyst metal particles and the carrier that supports the catalyst metal particles. For example, the outflow cell side catalyst layer is constituted by disposing a carrier with catalyst supporting the catalyst metal particles in the pores inside the partition wall.

Since the material of the catalyst metal particles is similar to that of the inflow cell side catalyst layer excluding that rhodium (Rh) and the like is used in some embodiments, the description is omitted here. Since an average grain diameter of the catalyst metal particles is similar to that of the inflow cell side catalyst layer, the description is omitted here.

While a content of the catalyst metal particles is not specifically limited and a general content can be used, the content differs depending on the material of the catalyst metal particles. For example, when the material is Rh, Pd, or Pt, the content is within a range of 0.01 g or more and 2 g or less per liter of the honeycomb substrate in some embodiments. This is because the content at the lower limit or more of the range allows sufficiently obtaining a catalytic action, and the content at the upper limit or less of the range is advantageous from an aspect of cost, simultaneously with ensuring suppressing a grain growth of the catalyst metal particles. Here, "the content of the catalyst metal particles per liter of a volume of the substrate" means a value similar to that of the catalyst metal particles contained in the outflow cell side catalyst layer disposed on the surface on the outflow cell side of the partition wall.

Since the material and the shape of the carrier, and the average grain diameter of the powdery carrier are similar to those of the inflow cell side catalyst layer, the description is omitted here. Since the mass ratio of the catalyst metal particles to the total mass of the catalyst metal particles and the carrier is similar to that of the inflow cell side catalyst layer, the description is omitted here. Since a method for causing the carrier to support the catalyst metal particles is similar to that of the inflow cell side catalyst layer, the description is omitted here. The outflow cell side catalyst layer may contain the promoter similarly to the inflow cell side catalyst layer.

While a density of the outflow cell side catalyst layer is not specifically limited, the density is within a range of 30 g/L or more and 150 g/L or less in some embodiments. This is because the density at the lower limit or more of the range ensures the effectively improved purification performance. This is because the density at the upper limit or less of the range ensures the effectively suppressed pressure loss.

While the method for forming the outflow cell side catalyst layer is not specifically limited and a general method can be used, examples of the method include a method that supplies a slurry to the inner region on the outflow cell side in the outflow cell side catalyst region of the partition wall and then dries and fires the slurry.

Since the method is similar to the method for forming the inflow cell side catalyst layer except that the slurry contains the catalyst metal particles and the carrier contained in the outflow cell side catalyst layer and, for example, and the average grain diameter of the powdery carrier contained in the slurry may be appropriately adjusted such that the slurry penetrates the inside of the partition wall, the description is omitted here.

While a method for supplying the slurry to the inner region on the outflow cell side in the outflow cell side catalyst region of the partition wall is not specifically limited and a general method can be used, examples of the method include a method that immerses the honeycomb substrate in the slurry from the outflow side end surface side and takes out the honeycomb substrate from the slurry after a lapse of a predetermined period. This method may appropriately adjust a property, such as a concentration of solid content and viscosity of the slurry, such that the slurry penetrates the inside of the partition wall. Since the drying condition and the firing condition are similar to those of the method for forming the inflow cell side catalyst layer, the description is omitted here. Note that properties, such as the thickness and the porosity of the outflow cell side catalyst layer, can be adjusted by properties of the slurry, an amount of supplied slurry, the drying condition, the firing condition, and the like.

(2) Others

When the exhaust gas purification device further includes the outflow cell side catalyst layer, as in the second example, the catalyst metal particles contained in the inflow cell side catalyst layer contains at least one kind of palladium (Pd) and platinum (Pt) and the catalyst metal particles contained in the outflow cell side catalyst layer contains rhodium (Rh) in some embodiments. This is because, after the hydrocarbon (HC) contained in the exhaust gas is effectively removed by the catalyst metal particles contained in the inflow cell side catalyst layer, the exhaust gas contacts the outflow cell side catalyst layer, and therefore, poisoning of the rhodium (Rh) contained in the catalyst metal particles contained in the outflow cell side catalyst layer by the hydrocarbon (HC) can be suppressed.

The exhaust gas purification device usually further includes the sealing portion that seals an outflow side end of the inflow cell and the inflow side end of the outflow cell.

II. Second Embodiment

An exhaust gas purification device according to the second embodiment further includes an outflow side catalyst layer disposed on the surface on the inflow cell side or in the inner region on the inflow cell side in the outflow side region of the partition wall. The exhaust gas purification device features that a gas permeability of the outflow side partition wall portion including the outflow side region of the partition wall and the outflow side catalyst layer is higher than that of the catalyst-disposed partition wall portion.

First, the following describes an outline of the exhaust gas purification device according to the second embodiment with examples. Here, FIG. 4 is a cross-sectional view schematically illustrating a main part on a cross-sectional surface parallel to an extending direction of the cell in an exhaust gas purification device of a third example according to the second embodiment.

Figure 4:
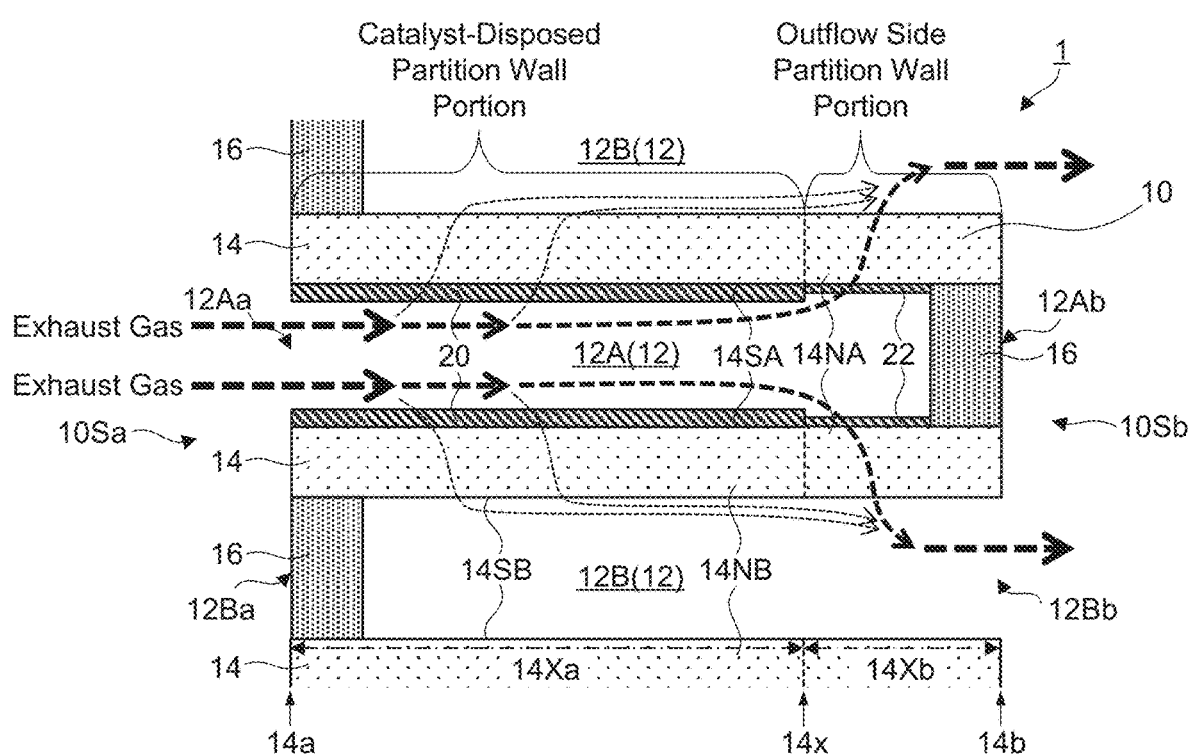
FIG. 4 is a cross-sectional view schematically illustrating a main part on a cross-sectional surface parallel to an extending direction of a cell in an exhaust gas purification device of a third example according to a second embodiment.

As illustrated in FIG. 4, the exhaust gas purification device 1 of the third example further includes an outflow side catalyst layer 22, in addition to the honeycomb substrate 10, the sealing portion 16, and the inflow cell side catalyst layer 20 same as those of the exhaust gas purification device of the first example according to the first embodiment. The outflow side catalyst layer 22 contains catalyst metal particles containing at least one kind (not illustrated) of palladium (Pd) and platinum (Pt), and a carrier (not illustrated) that supports the catalyst metal particles. The outflow side catalyst layer 22 is disposed on the surface 14SA on the inflow cell side in the outflow side region 14Xb of the partition wall 14. The outflow side catalyst layer 22 has a porosity of the same extent as the inflow cell side catalyst layer and is thinner than the inflow cell side catalyst layer 20. Accordingly, in the exhaust gas purification device 1 of the third example, the gas permeability of the outflow side partition wall portion including the outflow side region 14Xb of the partition wall 14 and the outflow side catalyst layer 22 is higher than that of the catalyst-disposed partition wall portion including the inflow cell side catalyst region 14Xa of the partition wall 14 and the inflow cell side catalyst layer 20.

Therefore, as illustrated in FIG. 1, when the exhaust gas passes through the exhaust gas purification device 1 of the third example, as illustrated in FIG. 4, the exhaust gas flows approximately similarly to the case where the exhaust gas passes through the exhaust gas purification device of the first example according to the first embodiment. Note that, unlike the case where the exhaust gas passes through the exhaust gas purification device of the first example, the exhaust gas passes through the outflow side catalyst layer 22 when passing through the outflow side partition wall portion.

Figure 5:
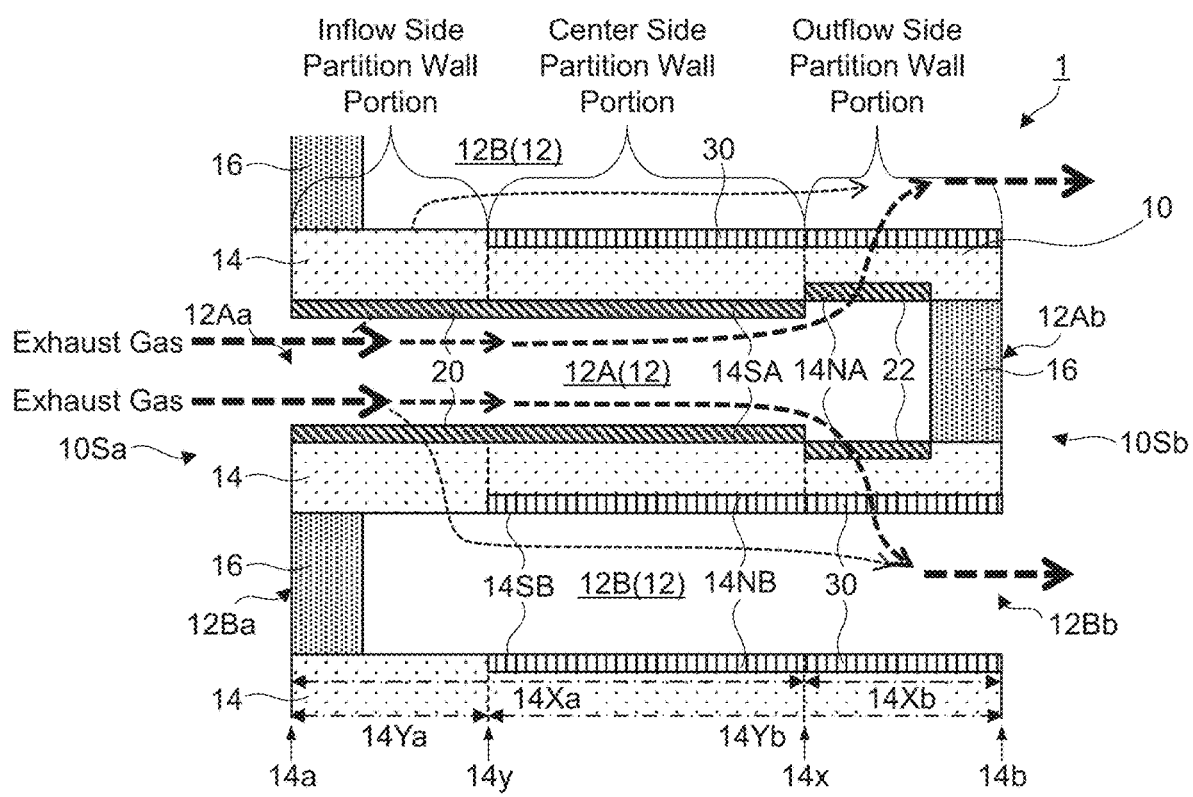
FIG. 5 is a cross-sectional view schematically illustrating a main part on a cross-sectional surface parallel to an extending direction of a cell in an exhaust gas purification device of a fourth example according to the second embodiment.

Here, FIG. 5 is a cross-sectional view schematically illustrating a main part on a cross-sectional surface parallel to an extending direction of the cell in an exhaust gas purification device of a fourth example according to the second embodiment.

As illustrated in FIG. 5, the exhaust gas purification device 1 of the fourth example includes the outflow cell side catalyst layer 30 different from that of the exhaust gas purification device of the second example and further includes the outflow side catalyst layer 22, in addition to the honeycomb substrate 10, the sealing portion 16, and the inflow cell side catalyst layer 20 same as those of the exhaust gas purification device of the second example according to the first embodiment. The outflow cell side catalyst layer 30 contains catalyst metal particles (not illustrated) containing rhodium (Rh) and a carrier (not illustrated) that supports the catalyst metal particles. The outflow cell side catalyst layer 30 is disposed in an inner region 14NB on the outflow cell side in the outflow cell side catalyst region 14Yb of the partition wall 14. Additionally, the outflow side catalyst layer 22 contains catalyst metal particles containing at least one kind (not illustrated) of palladium (Pd) and platinum (Pt), and a carrier (not illustrated) that supports the catalyst metal particles. The outflow side catalyst layer 22 is disposed in an inner region 14NA on the inflow cell side in the outflow side region 14Xb of the partition wall 14. The outflow side catalyst layer 22 is disposed on a surface surrounding the pores inside the partition wall 14 without closing the pores inside the partition wall 14.

The inflow cell side catalyst layer 20 and the outflow cell side catalyst layer 30 are disposed on the surface 14SA on the inflow cell side and in the inner region NB on the outflow cell side in the overlapping part of the inflow cell side catalyst region 14Xa and the outflow cell side catalyst region 14Yb of the partition wall 14, respectively. Meanwhile, the outflow side catalyst layer 22 and the outflow cell side catalyst layer 30 are disposed in the inner region 14NA on the inflow cell side and in the inner region 14NB on the outflow cell side in the outflow side region 14Xb of the partition wall 14, respectively, and the inflow cell side catalyst layer 20 is disposed on the surface 14SA on the inflow cell side in the inflow side region 14Ya of the partition wall 14.

Accordingly, in the exhaust gas purification device 1 of the fourth example, the gas permeability of the outflow side partition wall portion including the outflow side catalyst layer 22 and the outflow cell side catalyst layer 30 disposed in the outflow side region 14Xb and the outflow side region 14Xb of the partition wall 14 is higher than that of the center side partition wall portion (catalyst-disposed partition wall portion) including the overlapping part of the inflow cell side catalyst region 14Xa and the outflow cell side catalyst region 14Yb of the partition wall, and the inflow cell side catalyst layer 20 and the outflow cell side catalyst layer 30 disposed in the overlapping part. The gas permeability of the inflow side partition wall portion including the inflow side region 14Ya of the partition wall 14 and the inflow cell side catalyst layer 20 disposed in the inflow side region 14Ya is also higher than that of the center side partition wall portion.

Therefore, as illustrated in FIG. 1, when the exhaust gas passes through the exhaust gas purification device 1 of the fourth example, as illustrated in FIG. 5, the exhaust gas flows approximately similarly to the case where the exhaust gas passes through the exhaust gas purification device of the second example according to the first embodiment. Note that, unlike the case where the exhaust gas passes through the exhaust gas purification device of the second example, the exhaust gas passes through the outflow side catalyst layer 22 when passing through the outflow side partition wall portion.

The exhaust gas purification device according to the second embodiment, as in the third example and the fourth example, in addition to the inflow cell side catalyst layer disposed on the surface on the inflow cell side in the inflow cell side catalyst region of the partition wall, further includes the outflow side catalyst layer disposed on the surface on the inflow cell side or in the inner region on the inflow cell side in the outflow side region of the partition wall. The gas permeability of the outflow side partition wall portion including the outflow side region of the partition wall and the outflow side catalyst layer is higher than that of the catalyst-disposed partition wall portion including the inflow cell side catalyst region of the partition wall and the inflow cell side catalyst layer. Similarly to the first embodiment, this ensures the suppressed increase in pressure loss and the improved purification performance. Note that, unlike the first embodiment, since the exhaust gas passes through the outflow side catalyst layer when passing through the outflow side partition wall portion, the purification performance can be effectively improved.

Since a density of the outflow side catalyst layer can be configured so as to be smaller than that of the inflow cell side catalyst layer, and therefore a cost of the catalyst can be reduced. Furthermore, the exhaust gas flown into the inflow cell can mostly pass through the outflow side partition wall portion where the outflow side catalyst layer whose density is smaller than that of the inflow cell side catalyst layer is disposed, thereby ensuring easily trapping the PM in the exhaust gas in the pores of the partition wall.

Furthermore, among the exhaust gas purification devices according to the second embodiment, the exhaust gas purification device that does not include the catalyst layer on the outflow cell side of the partition wall as in the third example can effectively suppress the pressure loss similarly to the first embodiment. Additionally, the exhaust gas purification device that further includes the outflow cell side catalyst layer disposed on the outflow cell side in the outflow cell side catalyst region of the partition wall as in the fourth example can effectively improve the purification performance similarly to the first embodiment.

Subsequently, the following describes respective configurations of the exhaust gas purification device according to the second embodiment in detail.

1. Outflow Side Catalyst Layer

The outflow side catalyst layer is disposed on the surface on the inflow cell side in the outflow side region or in the inner region on the inflow cell side of the partition wall.

Here, "disposed on the surface on the inflow cell side in the outflow side region of the partition wall" means "disposed in contact with the surface on the inflow cell side in the outflow side region of the partition wall on the outside of the partition wall." "Disposed in the inner region on the inflow cell side in the outflow side region of the partition wall" means "disposed in a region facing the inflow cell inside the outflow side region of the partition wall."

Regarding the outflow side catalyst layer, the following separately describes the outflow side catalyst layer disposed on the surface on the inflow cell side of the partition wall like the outflow side catalyst layer 22 in the third example and the outflow side catalyst layer disposed in the inner region on the inflow cell side of the partition wall like the outflow side catalyst layer 22 of the fourth example.

a. Outflow Side Catalyst Layer Disposed on the Surface on the Inflow Cell Side of the Partition Wall While the outflow side catalyst layer is not specifically limited insofar as the gas permeability of the outflow side partition wall portion is higher than that of the catalyst-disposed partition wall portion, examples of the outflow side catalyst layer include one that has a porosity of the same extent as the inflow cell side catalyst layer and is thinner than the inflow cell side catalyst layer. Note that the outflow side catalyst layer that has the porosity of the same extent as the inflow cell side catalyst layer and is thicker than the inflow cell side catalyst layer is formed, for example, under conditions same as those of the inflow cell side catalyst layer excluding that an amount of supplied slurry per unit area is reduced, and the porosity of the outflow side catalyst layer is in a range of ±10% of the porosity of the inflow cell side catalyst layer.

While a thickness of the outflow side catalyst layer is not specifically limited as long as the gas permeability of the outflow side partition wall portion is higher than that of the catalyst-disposed partition wall portion, for example, the thickness of the outflow side catalyst layer is in a range of 5% or more of the thickness of the partition wall in some embodiments. This is because the thickness at the lower limit or more of the range allows ensuring an exhaust gas purification action when the exhaust gas flows parallel to the partition wall.

The outflow side catalyst layer usually contains the catalyst metal particles and the carrier that supports the catalyst metal particles. The outflow side catalyst layer is, for example, a porous sintered body of a carrier with catalyst supporting the catalyst metal particles.

Since the material and the average grain diameter of the catalyst metal particles are similar to those of the inflow cell side catalyst layer, the description is omitted here. A content of the catalyst metal particles is not specifically limited and a general content can be used.

Since the material and the shape of the carrier and the average grain diameter of the powdery carrier are similar to those of the inflow cell side catalyst layer, the description is omitted here. Since the mass ratio of the catalyst metal particles to the total mass of the catalyst metal particles and the carrier is similar to that of the inflow cell side catalyst layer, the description is omitted here. Since a method for causing the carrier to support the catalyst metal particles is similar to that of the inflow cell side catalyst layer, the description is omitted here. The outflow side catalyst layer may contain the promoter similarly to the inflow cell side catalyst layer.

While a density of the outflow side catalyst layer is not specifically limited, the density is usually lower than that of the inflow cell side catalyst layer. Note that "the density of the outflow side catalyst layer" means a value found by dividing a total mass of the outflow side catalyst layer by the volume of a part in the axial direction of the honeycomb substrate, wherein the part in the axial direction of the honeycomb substrate has the axial length which is the same as the length in the extending direction of the outflow side catalyst layer.

While a method for forming the outflow side catalyst layer is not specifically limited and a general method can be used, examples of the method include a method that supplies a slurry to the surface on the inflow cell side in the outflow side region of the partition wall and then dries and fires the slurry.

Except that the slurry contains the catalyst metal particles and the carrier contained in the outflow side catalyst layer, since the slurry is similar to that of the method for forming the inflow cell side catalyst layer, the description is omitted here.

While a method for supplying the slurry to the surface on the inflow cell side in the outflow side region of the partition wall is not specifically limited and a general method can be used, examples of the method include a method that immerses the honeycomb substrate in the slurry from the inflow side end surface side and takes out the honeycomb substrate from the slurry after a lapse of a predetermined period. This method may apply pressure to the outflow cells from the outflow side end side to generate a pressure difference between the outflow cells and the inflow cells to avoid the slurry to penetrate the inside of the partition wall. Alternatively, for example, a property, such as a concentration of solid content and viscosity of the slurry, may be appropriately adjusted to avoid the slurry to penetrate the inside of the partition wall. Since the drying condition and the firing condition are similar to those of the method for forming the inflow cell side catalyst layer, the description is omitted here. Note that properties, such as the thickness and the porosity of the outflow side catalyst layer can be adjusted by properties of the slurry, an amount of supplied slurry, the drying condition, the firing condition, and the like.

b. Outflow Side Catalyst Layer Disposed in the Inner Region on the Inflow Cell Side of the Partition Wall While the outflow side catalyst layer is not specifically limited as long as the gas permeability of the outflow side partition wall portion is higher than that of the catalyst-disposed partition wall portion, examples of the outflow side catalyst layer include one disposed on a surface surrounding the pores inside the partition wall without closing the pores inside the partition wall.

While a thickness of the outflow side catalyst layer is not specifically limited and a general thickness can be used, for example, the thickness is within a range of 50% or more and 100% or less of the thickness of the partition wall in some embodiments. This is because the thickness at the lower limit or more of the range allows ensuring a frequency of contact of the exhaust gas with the catalyst layer while the exhaust gas passes through the partition wall.

The outflow side catalyst layer contains the catalyst metal particles and the carrier that supports the catalyst metal particles. For example, the outflow side catalyst layer is constituted by disposing a carrier with catalyst supporting the catalyst metal particles in the pores inside the partition wall.

Since the material and the average grain diameter of the catalyst metal particles are similar to those of the inflow cell side catalyst layer, the description is omitted here. A content of the catalyst metal particles is not specifically limited and a general content can be used.

Since the material and the shape of the carrier and the average grain diameter of the powdery carrier are similar to those of the inflow cell side catalyst layer, the description is omitted here. Since the mass ratio of the catalyst metal particles to the total mass of the catalyst metal particles and the carrier is similar to that of the inflow cell side catalyst layer, the description is omitted here. Since a method for causing the carrier to support the catalyst metal particles is similar to that of the inflow cell side catalyst layer, the description is omitted here. The outflow side catalyst layer may contain the promoter similarly to the inflow cell side catalyst layer. While a density of the outflow side catalyst layer is not specifically limited, the density is usually lower than that of the inflow cell side catalyst layer.

While a method for forming the outflow side catalyst layer is not specifically limited and a general method can be used, examples of the method include a method that supplies a slurry to the inner region on the inflow cell side in the outflow side region of the partition wall and then dries and fires the slurry.

Since the slurry is similar to that of the method for forming the inflow cell side catalyst layer except that the slurry contains the catalyst metal particles and the carrier contained in the outflow side catalyst layer and, the average grain diameter, etc. of the powdery carrier contained in the slurry may be appropriately adjusted such that the slurry penetrates the inside of the partition wall, the description is omitted here.

While the method for supplying the slurry to the inner region on the inflow cell side in the outflow side region of the partition wall is not specifically limited and a general method can be used, examples of the method include a method that immerses the honeycomb substrate in the slurry from the inflow side end surface side and takes out the honeycomb substrate from the slurry after a lapse of a predetermined period. This method may appropriately adjust a property, such as a concentration of solid content and viscosity of the slurry, such that the slurry penetrates the inside of the partition wall. Since the drying condition and the firing condition are similar to those of the method for forming the inflow cell side catalyst layer, the description is omitted here. Note that properties, such as the thickness and the porosity of the outflow side catalyst layer can be adjusted by properties of the slurry, an amount of supplied slurry, the drying condition, the firing condition, and the like.

2. Others

Since the honeycomb substrate and the inflow cell side catalyst layer are similar to those of the first embodiment, the description is omitted here. While the exhaust gas purification device is not specifically limited, the exhaust gas purification device may further include the outflow cell side catalyst layer disposed on the surface on the outflow cell side or in the inner region on the outflow cell side in the outflow cell side catalyst region from the position close to the inflow side end to the outflow side end of the partition wall as in the fourth example. Since the outflow side catalyst layer and the exhaust gas purification device that further includes the outflow cell side catalyst layer are similar to those of the first embodiment, the description is omitted here. The exhaust gas purification device usually further includes the sealing portion similar to that of the first embodiment.

EXAMPLES

The following further specifically describes the exhaust gas purification device according to this embodiment with the example and reference examples.

Example

For evaluation for an influence of the length in the extending direction of the inflow cell side catalyst layer in the exhaust gas purification device according to this embodiment on a pressure loss by simulation described later, a calculation model of the exhaust gas purification device according to this embodiment was prepared. A configuration of the calculation model is as follows.

Shape of honeycomb substrate: cylindrical shape
Size of honeycomb substrate: outer diameter: 129 mm×axial length: 150 mm
Cell density: 300 pieces per square inch
Thickness of partition wall: 200 μm
Length in the extending direction of the sealing portion: 4% of the length of the extending direction of the partition wall
Exhaust gas permeability: Fr portion (catalyst-disposed partition wall portion)=1E-14, Rr portion (outflow side partition wall portion)=1E-13
Inlet gas temperature: 300 K
Gas flow rate: 7 m$^3$/min

[Influence of the Length in the Extending Direction of the Inflow Cell Side Catalyst Layer on the Pressure Loss]

Through simulations, an influence of a length of an Fr coat in the calculation model of the example (a proportion of the length in the extending direction of the inflow cell side catalyst layer to the length in the extending direction of the partition wall) on the pressure loss was evaluated. Conditions for the simulation are as follows.

Figure 6:
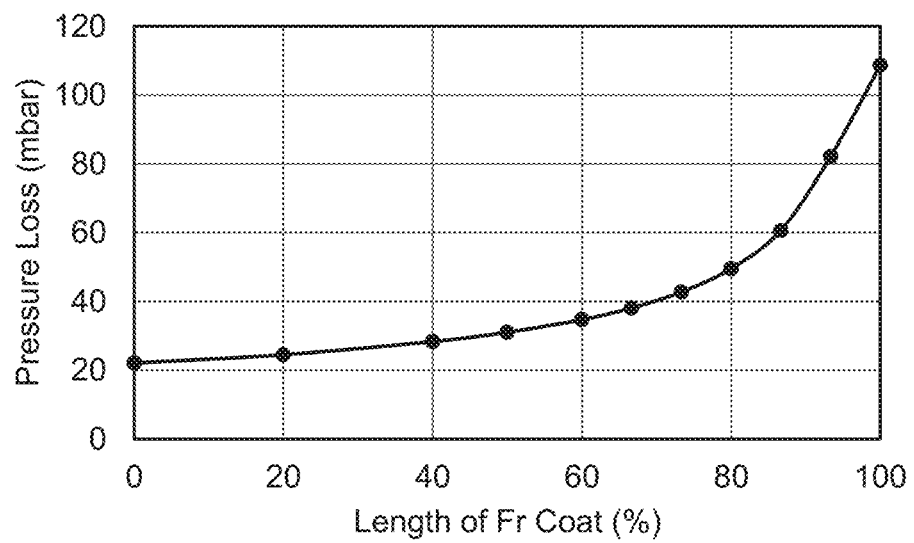
FIG. 6 is a graph illustrating a pressure loss relative to a length of an Fr coat in a calculation model of an example.

Analysis method: exhaust aftertreatment simulation
Used software: Axisuite manufactured by Exothermia
Component: Axitrap FIG. 6 is a graph illustrating the pressure loss relative to the length of the Fr coat in the calculation model of the example. As illustrated in FIG. 6, when the length of the Fr coat (the proportion of the length in the extending direction of the inflow cell side catalyst layer to the length in the extending direction of the partition wall) became more than 80%, an increase sensitivity of the pressure loss increased.

Reference Example 1-1

Figure 7A:
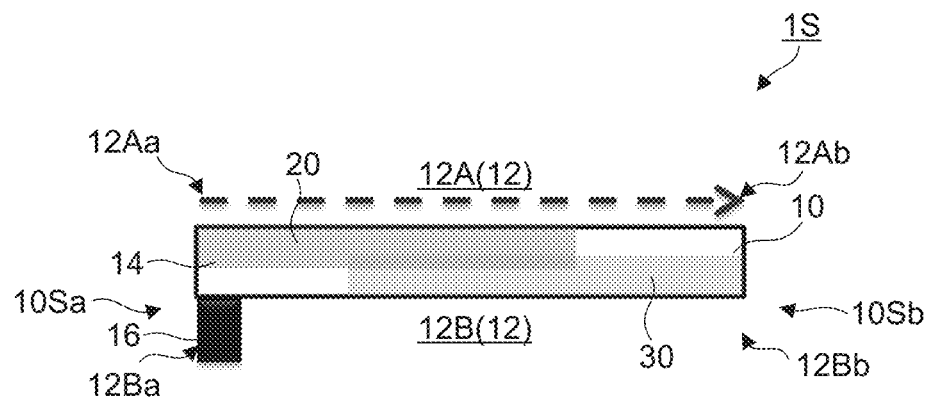
FIG. 7A is a cross-sectional view schematically illustrating a test object of an exhaust gas purification device prepared in Reference Example 1-1.

FIG. 7A is a cross-sectional view schematically illustrating a test object of the exhaust gas purification device prepared in Reference Example 1-1.

In Reference Example 1-1, as illustrated in FIG. 7A, a test object 1S of the exhaust gas purification device including the honeycomb substrate 10, the sealing portion 16, the inflow cell side catalyst layer 20, and the outflow cell side catalyst layer 30 was prepared.

Specifically, first, a GPF over which a catalyst was not coated and that included the honeycomb substrate 10 made of cordierite with an axial length of 80 mm in which a cylindrical-shaped frame portion (not illustrated) and the partition wall 14 that partitions a space inside the frame portion in a honeycomb shape were integrally formed, and the sealing portion 16 having the length in the extending direction of 4 mm was prepared. In the GPF, only the inflow side end 12Ba of the outflow cell 12B was sealed by the sealing portion 16.

Next, a carrier with catalyst that supported rhodium (Rh) on a powdery carrier was mixed with solvent to prepare a slurry for forming inflow cell side catalyst layer.

Next, after the slurry for forming inflow cell side catalyst layer was supplied to the inner region on the inflow cell side in the inflow cell side catalyst region of the partition wall 14 in the GPF, the GPF was dried and fired. Thus, the inflow cell side catalyst layer 20 having the length in the extending direction of 7/10 of the partition wall, a thickness of 50% of the partition wall, and a content of the rhodium (Rh) per liter of a volume of the substrate of 0.3 g/L was formed.

Next, a carrier with catalyst that supported palladium (Pd) on a powdery carrier was mixed with solvent to prepare a slurry for forming outflow cell side catalyst layer.

Next, after the slurry for forming outflow cell side catalyst layer was supplied to the inner region on the outflow cell side in the outflow cell side catalyst region of the partition wall 14 in the GPF, the GPF was dried and fired. Thus, the outflow cell side catalyst layer 30 having the length in the extending direction of 7/10 of the partition wall, a thickness of 50% of the partition wall, and a content of the palladium (Pd) per liter of a volume of the substrate was 0.6 g/L was formed. In this respect, the outflow cell side catalyst layer 30 was formed so as to meet: density of the inflow cell side catalyst layer 20>density of the outflow cell side catalyst layer 30. As described above, the test object 1S of the exhaust gas purification device was prepared.

Reference Example 1-2

The test object 1S of the exhaust gas purification device which is the same as that of Reference Example 1-1, except that the honeycomb substrate 10 having the axial length of 122 mm was prepared, was prepared.

Reference Example 1-3

The test object 1S of the exhaust gas purification device which is the same as that of Reference Example 1-1, except that the honeycomb substrate 10 having the axial length of 150 mm was prepared, was prepared.

Reference Example 2-1

Figure 7B:
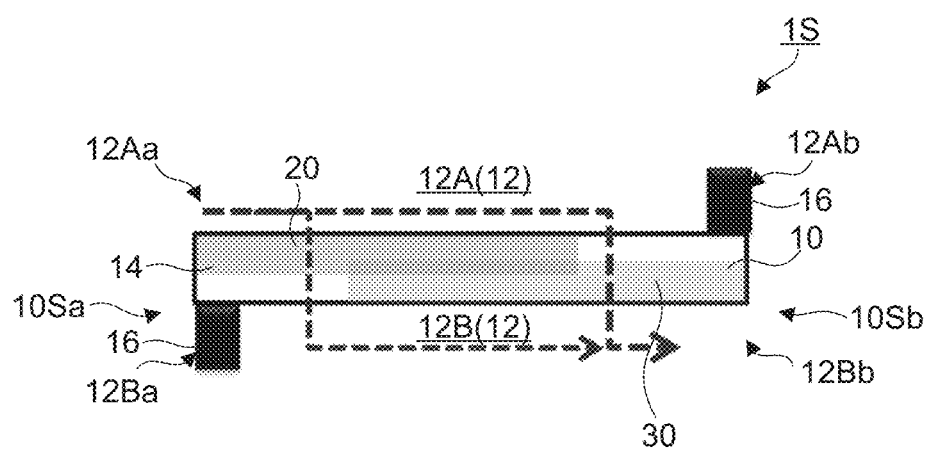
FIG. 7B is a cross-sectional view schematically illustrating a test object of an exhaust gas purification device prepared in Reference Example 2-1.

FIG. 7B is a cross-sectional view schematically illustrating a test object of the exhaust gas purification device prepared in Reference Example 2-1.

As illustrated in FIG. 7B, in Reference Example 2-1, the test object 1S of the exhaust gas purification device which is the same as that of Reference Example 1-1, except that both of the inflow side end 12Ba of the outflow cell 12B and the outflow side end 12Ab of the inflow cell 12A were sealed by the sealing portion 16, was prepared.

Reference Example 2-2

The test object 1S of the exhaust gas purification device which is the same as that of Reference Example 2-1, except that the honeycomb substrate 10 having the axial length of 122 mm was prepared, was prepared.

Reference Example 2-3

The test object 1S of the exhaust gas purification device which is the same as that of Reference Example 2-1, except that the honeycomb substrate 10 having the axial length of 150 mm was prepared, was prepared.

Comparison of the Purification Performances of the Exhaust Gas Purification Device The test object 1S of the exhaust gas purification device of each reference example was installed on a model gas evaluation facility and a NOx purification rate at each inlet gas temperature of the exhaust gas was obtained. Specifically, when the exhaust gas was flown into from the inflow side end surface 10Sa at a flow rate of 80 L/min while the inlet gas temperature was increased from 150° C. at a temperature increase rate of 20° C./min and the exhaust gas was flown out to the outside from the outflow side end surface 10Sb, the NOx purification rates were obtained from NOx concentration setting values of the inlet gas at respective inlet gas temperatures and measured values of NOx concentrations on the outlet side.

Figure 8A:
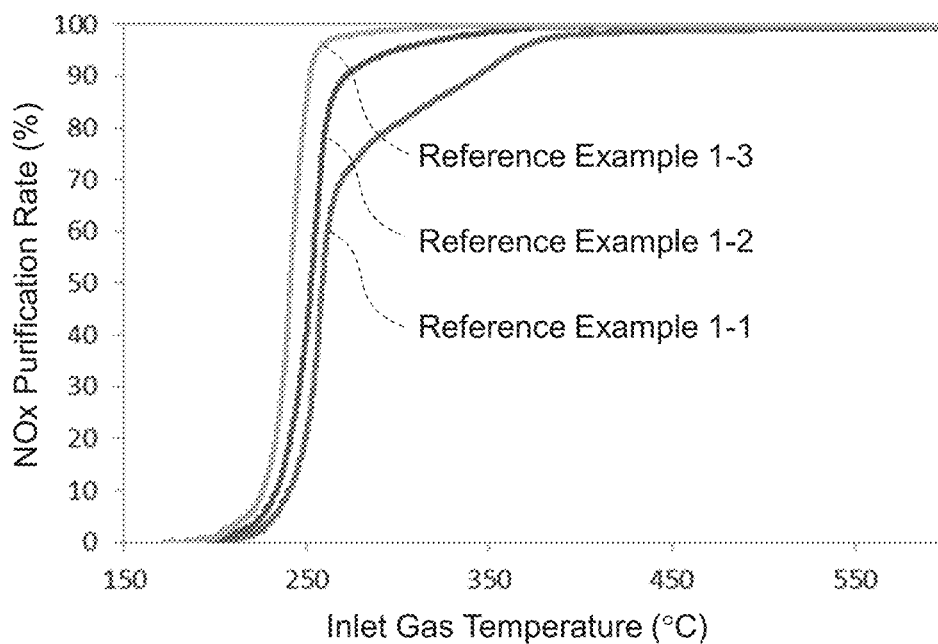
FIG. 8A is a graph illustrating NOx purification rates at respective inlet gas temperatures in exhaust gas purification devices of Reference Examples 1-1 to 1-3.

FIG. 8A is a graph illustrating the NOx purification rates at the respective inlet gas temperatures in the exhaust gas purification devices of Reference Examples 1-1 to 1-3. Meanwhile, FIG. 8B is a graph illustrating NOx purification rates at respective inlet gas temperatures in the exhaust gas purification devices of Reference Examples 2-1 to 2-3.

Figure 8B:
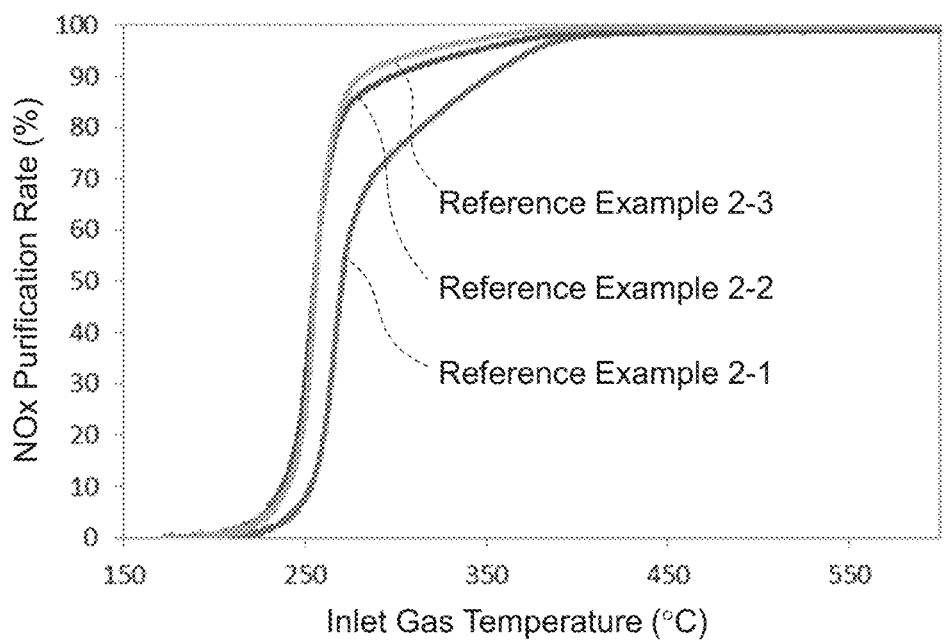
FIG. 8B is a graph illustrating NOx purification rates at respective inlet gas temperatures in exhaust gas purification devices of Reference Examples 2-1 to 2-3.

As illustrated in FIG. 8A and FIG. 8B, for example, at the inlet gas temperature of 250° C., the NOx purification rates in Reference Examples 1-1 to 1-3 became higher than those of Reference Examples 2-1 to 2-3, respectively. The same applied at the other inlet gas temperatures. It is conceivable that this occurred because of the following reason. In the test objects 1S of Reference Examples 1-1 to 1-3, as indicated by the arrow in FIG. 7A, almost all of the exhaust gas that flown into the inflow cell 12A flowed up to the outflow side end 12Ab while being in contact with the inflow cell side catalyst layer 20. Meanwhile, in the test objects 1S of Reference Examples 2-1 to 2-3, as indicated by the arrow in FIG. 7B, after a part of the exhaust gas flown into the inflow cell 12A flowed up to the outflow side partition wall portion where the inflow cell side catalyst layer 20 was absent while being in contact with the inflow cell side catalyst layer 20, the part of the exhaust gas passed through the outflow side partition wall portion to flow in the outflow cell 12B. After the other part of the exhaust gas passed through the inflow side partition wall portion where the outflow cell side catalyst layer 30 was absent to flow in the outflow cell 12B, the exhaust gas flowed up to the outflow side end 12Bb while being in contact with the outflow cell side catalyst layer 30.

Figure 9:
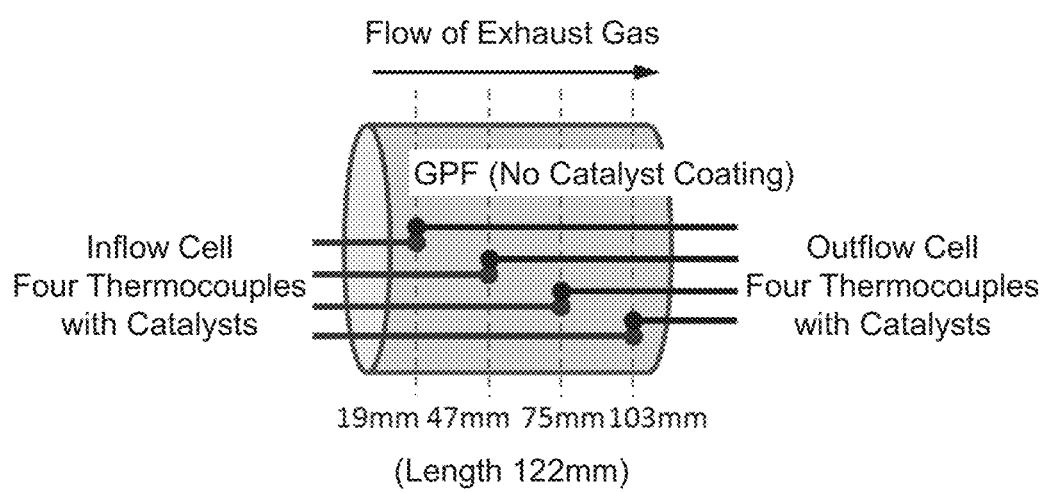
FIG. 9 is a drawing schematically illustrating a testing device that examines reaction periods of an exhaust gas on a surface of and inside the partition wall in the exhaust gas purification device.

Reaction Period of the Exhaust Gas on the Surface of and Inside the Partition Wall in the Exhaust Gas Purification Device FIG. 9 is a drawing schematically illustrating a testing device that examines the reaction periods of the exhaust gas on the surface of and inside the partition wall in the exhaust gas purification device.

The testing device was a GPF over which a catalyst was not coated and that included a honeycomb substrate made of cordierite having the axial length of 122 mm in which a cylindrical-shaped frame portion and a partition wall partitioning a space inside the frame portion in a honeycomb shape were integrally formed and a sealing portion having a length in the extending direction of 4 mm, and thermocouples with catalyst were installed to the GPF. In the testing device, both of the inflow side end of the outflow cell and the outflow side end of the inflow cell were sealed by the sealing portion. The respective thermocouples with catalysts were installed at respective positions away from the inflow side end in the extending direction by 19 mm, 47 mm, 75 mm, and 103 mm in the inflow cell and the outflow cell.

Figure 10:
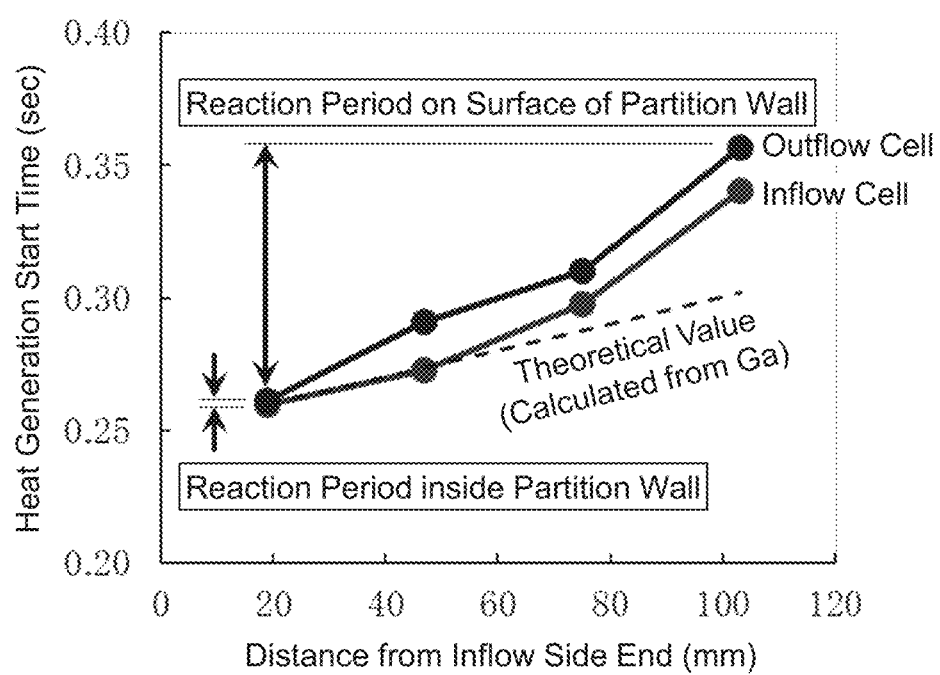
FIG. 10 is a graph illustrating heat generation start times of respective thermocouples with catalysts installed in an inflow cell and an outflow cell in the testing device illustrated in FIG. 9.

To examine the reaction periods of the exhaust gas on the surface of and inside the partition wall, the testing device illustrated in FIG. 9 measured a period from an inflow start of the exhaust gas until the respective thermocouples with catalysts installed in the inflow cell and the outflow cell started generating a heat (hereinafter abbreviated as "heat generation start time"), when the exhaust gas was flown into from the inflow side end surface at a flow rate of 30 g/s at the inlet gas temperature of 400° C. and flown out to the outside from the outflow side end surface. FIG. 10 is a graph illustrating the heat generation start times of the respective thermocouples with catalysts installed in the inflow cell and the outflow cell in the testing device illustrated in FIG. 9.

As found from the heat generation start time of the respective thermocouples with catalysts illustrated in FIG. 10, a period equivalent to the reaction period of the exhaust gas on the surface of the partition wall (a period that the exhaust gas moves from the inflow side end to the outflow side end in the inflow cell (outflow cell)) was approximately 0.1 sec. In contrast to this, a period equivalent to the reaction period of the exhaust gas inside the partition wall (a period required for the exhaust gas flown into the inflow cell to passe through the partition wall to flow in the outflow cell) was extremely short, approximately $\frac{1}{10}$.

While the embodiments of the exhaust gas purification device of the present disclosure have been described in detail above, the present disclosure is not limited to the above-described embodiment, and can be subjected to various kinds of changes of design without departing from the spirit of the present disclosure described in the claims.

All publications, patents and patent applications cited in the present description are herein incorporated by reference as they are.

DESCRIPTION OF SYMBOLS

1 Exhaust gas purification device
10 Honeycomb substrate
10Sa Inflow side end surface of honeycomb substrate
10Sb Outflow side end surface of honeycomb substrate
12 Cell
12A Inflow cell
12Aa Inflow side end of inflow cell
12Ab Outflow side end of inflow cell
12B Outflow cell
12Ba Inflow side end of outflow cell
12Bb Outflow side end of outflow cell
14 Partition wall
14*a* Inflow side end of partition wall
14*y* Position close to inflow side end of partition wall
14*b* Outflow side end of partition wall
14*x* Position close to outflow side end of partition wall
14Xa Inflow cell side catalyst region of partition wall
14Xb Outflow side region of partition wall
14Ya Inflow side region of partition wall
14Yb Outflow cell side catalyst region of partition wall
14SA Surface on inflow cell side of partition wall
14NA Inner region on inflow cell side of partition wall
14SB Surface on outflow cell side of partition wall
14NB Inner region on outflow cell side of partition wall
16 Sealing portion
20 Inflow cell side catalyst layer
22 Outflow side catalyst layer
30 Outflow cell side catalyst layer

What is claimed is:

1. An exhaust gas purification device comprising:
a honeycomb substrate; and
an inflow cell side catalyst layer which contains catalyst metal particles and a carrier that supports the catalyst metal particles,
an outflow cell side catalyst layer which contains catalyst metal particles and a carrier that supports the catalyst metal particles,
wherein the honeycomb substrate includes a porous partition wall, the porous partition wall defining a plurality of cells extending from an inflow side end surface to an outflow side end surface in an extending direction,
wherein the plurality of cells include inflow cells and outflow cells adjacent to one another, the partition wall being interposed between the inflow cells and the outflow cells,
wherein the inflow cells have open inflow side ends and sealed outflow side ends,
wherein the outflow cells have sealed inflow side ends and open outflow side ends,
wherein the material of the catalyst metal particles contained in the inflow cell side catalyst layer includes a noble metal, and the material of the carrier contained in the inflow cell side catalyst layer includes a metal oxide or the solid solution of the metal oxide,
wherein the material of the catalyst metal particles contained in the outflow cell side catalyst layer includes a noble metal, and the material of the carrier contained in the outflow cell side catalyst layer includes a metal oxide or the solid solution of the metal oxide,
wherein the inflow cell side catalyst layer is disposed in contact with a surface on the inflow cell side in an inflow cell side catalyst region from an inflow side end to a position close to an outflow side end of the partition wall on the outside of the partition wall,
wherein the outflow cell side catalyst layer is disposed on a surface on the outflow cell side or in an inner region on the outflow cell side in an outflow cell side catalyst region from a position close to the inflow side end to the outflow side end of the partition wall,
wherein the length in the extending direction of the inflow cell side catalyst layer is within a range of ⅔ or more and ⅘ or less of the length in the extending direction of the partition wall, and
wherein an outflow side partition wall portion in which the outflow cell side catalyst layer is disposed in an outflow side region from the position close to the outflow side end to the outflow side end of the partition wall, and a center side partition wall portion in which the inflow cell side catalyst layer and the outflow cell side catalyst layer are disposed in an overlapping part of the inflow cell side catalyst region and the outflow cell side catalyst region of the partition wall are provided in the partition wall.

2. The exhaust gas purification device according to claim 1,
wherein a catalyst layer which contains catalyst metal particles and a carrier that supports the catalyst metal particles is absent on the surface on the inflow cell side and in an inner region on the inflow cell side in the outflow side region of the partition wall.

3. The exhaust gas purification device according to claim 1, further comprising
an outflow side catalyst layer, which contains catalyst metal particles and a carrier that supports the catalyst metal particles, disposed on the surface on the inflow cell side or in an inner region on the inflow cell side in the outflow side region of the partition wall,
wherein the material of the catalyst metal particles contained in the outflow side catalyst layer includes a noble metal, and the material of the carrier contained in the outflow side catalyst layer includes a metal oxide or the solid solution of the metal oxide,
wherein the outflow side partition wall portion in which the outflow side catalyst layer in addition to the outflow cell side catalyst layer is further disposed in the outflow side region of the partition wall, and the center side partition wall portion are provided in the partition wall.

* * * * *